US008441339B2

(12) United States Patent
Okada et al.

(10) Patent No.: US 8,441,339 B2
(45) Date of Patent: May 14, 2013

(54) DISPLACEMENT DETECTOR, DISPLACEMENT DETECTION APPARATUS, DISPLACEMENT DETECTION SYSTEM, LOOSENING DETECTOR, LOOSENING DETECTION APPARATUS, AND LOOSENING DETECTION SYSTEM

(75) Inventors: Shinichi Okada, Tokyo (JP); Noboru Araki, Tokyo (JP); Masami Saruya, Tokyo (JP); Yoshikazu Terasawa, Osaka (JP)

(73) Assignee: Uchimura Co., Ltd., Osaka (JP)

( * ) Notice: Subject to any disclaimer, the term of this patent is extended or adjusted under 35 U.S.C. 154(b) by 565 days.

(21) Appl. No.: 12/790,102

(22) Filed: May 28, 2010

(65) Prior Publication Data

US 2010/0308969 A1 Dec. 9, 2010

(30) Foreign Application Priority Data

Jun. 4, 2009 (JP) .................. 2009-135472

(51) Int. Cl.
*H04Q 5/22* (2006.01)

(52) U.S. Cl.
USPC ...................................... 340/10.1; 340/572.1

(58) Field of Classification Search ................ 340/10.1, 340/10.3, 10.31, 10.4, 10.41, 1.5, 572.1, 340/572.3, 652, 545.2, 572.7; 24/606; 73/761, 73/849; 411/396, 911, 14, 327
See application file for complete search history.

(56) References Cited

U.S. PATENT DOCUMENTS

| 7,246,980 B2* | 7/2007 | Azzalin et al. ................ 411/396 |
| 2007/0063847 A1* | 3/2007 | Lee et al. .................... 340/572.1 |

FOREIGN PATENT DOCUMENTS

| JP | 2005-140653 | 6/2005 |
| JP | 2006-308342 | 11/2006 |

* cited by examiner

*Primary Examiner* — Nabil Syed
(74) *Attorney, Agent, or Firm* — SoCal IP Law Group LLP; John E. Gunther; Steven C. Sereboff

(57) ABSTRACT

The present invention provides a displacement detector for a relative displacement of a fixed member and a movable member, which includes a first member and a second member. The first member is secured to the fixed member and composed of an insulator. The second member moves relative to the fixed member, integrally with the movable member. The second member is disposed opposite to the first member. The second member is composed of an insulator. Either of the first member and the second member includes an IC tag for detection performing non-contact communication, and the other includes a blocking member composed of a conductor blocking the communication performed by the IC tag. When the second member moves a predetermined amount relative to the first member, starting from an initial state, the IC tag for detection moves from inside to outside a region of the blocking member or vice versa.

22 Claims, 10 Drawing Sheets

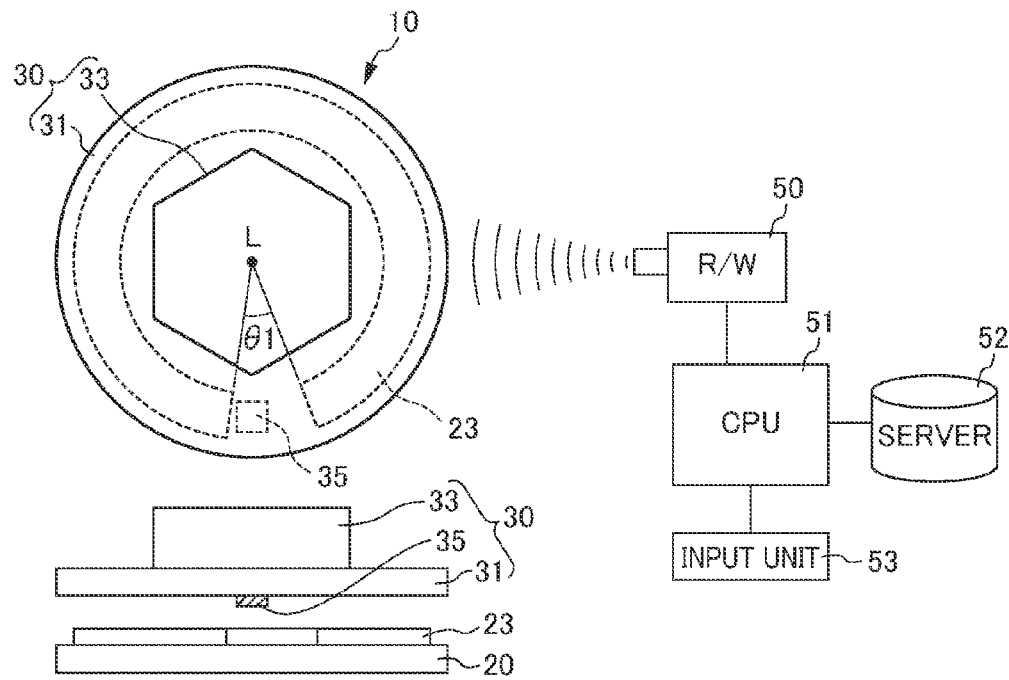
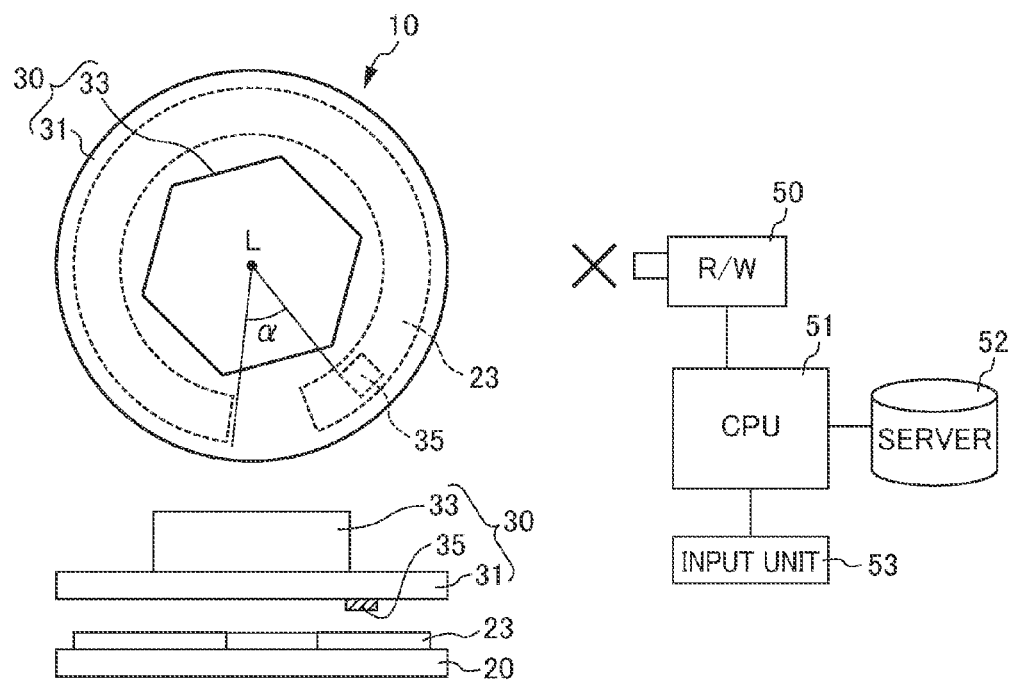

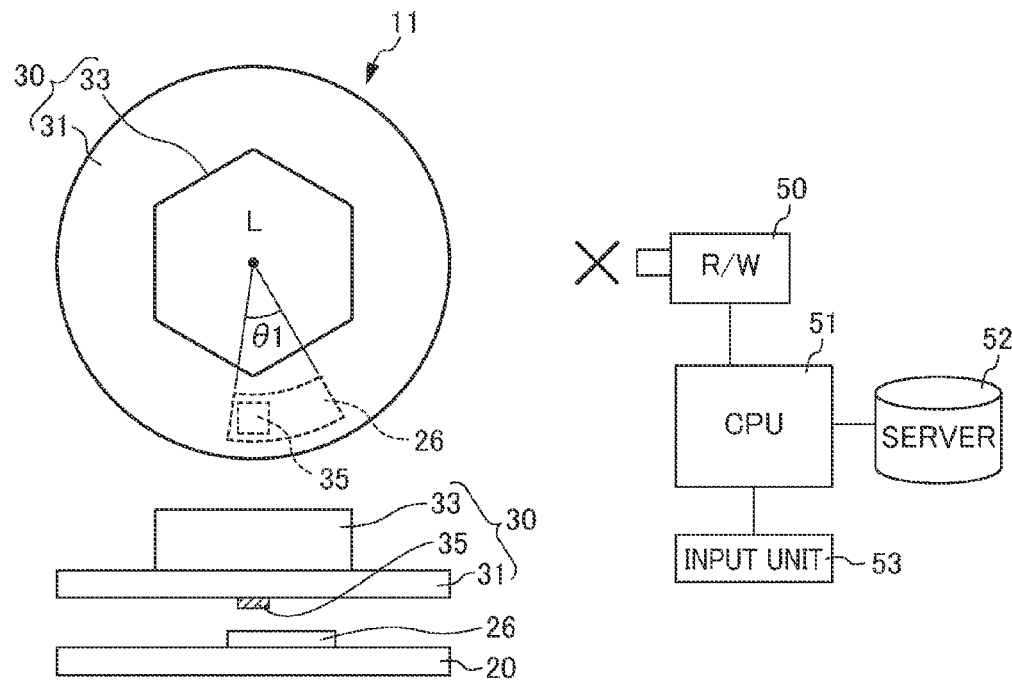
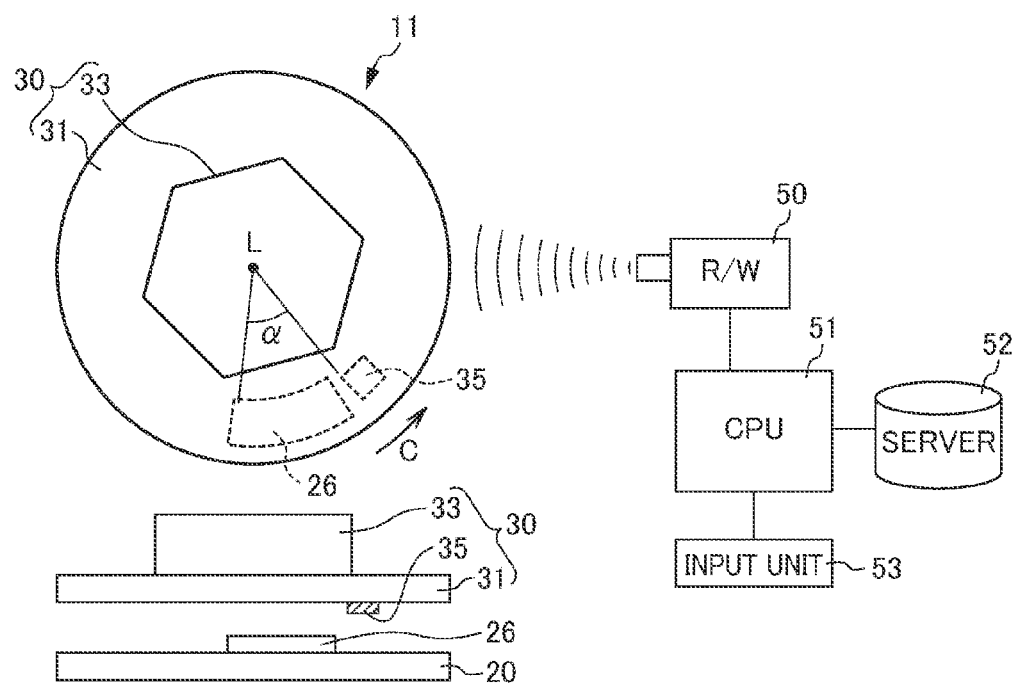

FIG. 4A
FIG. 4B
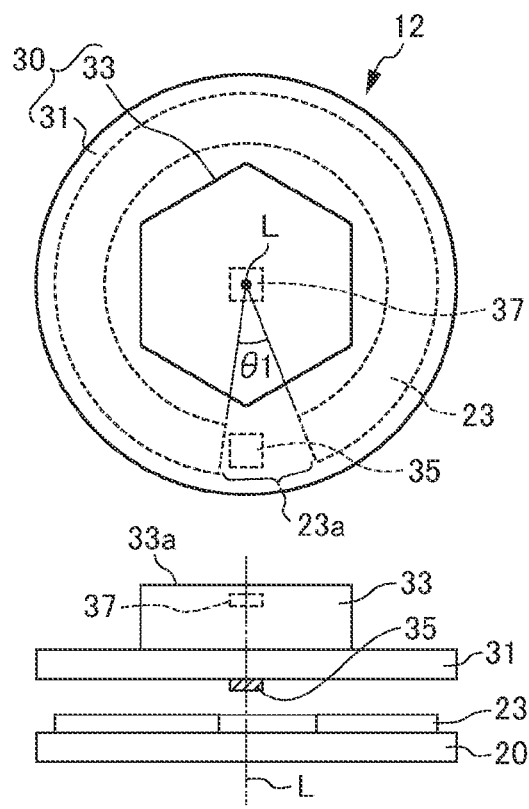
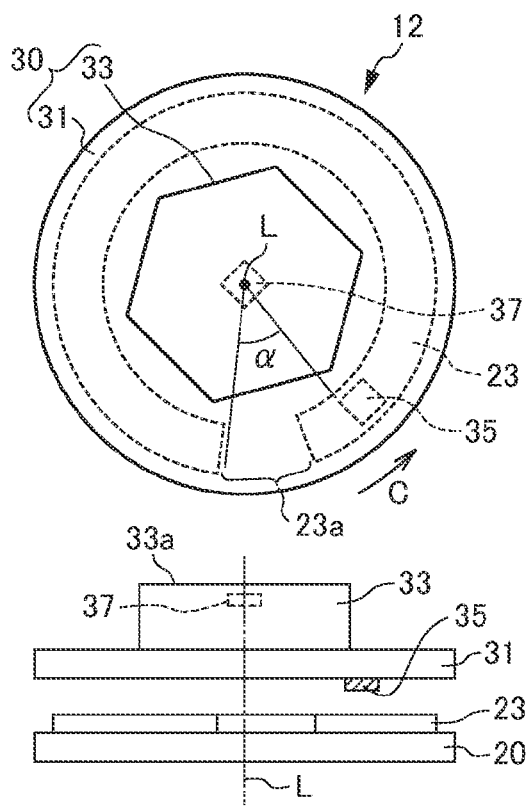

FIG. 5A
FIG. 5B
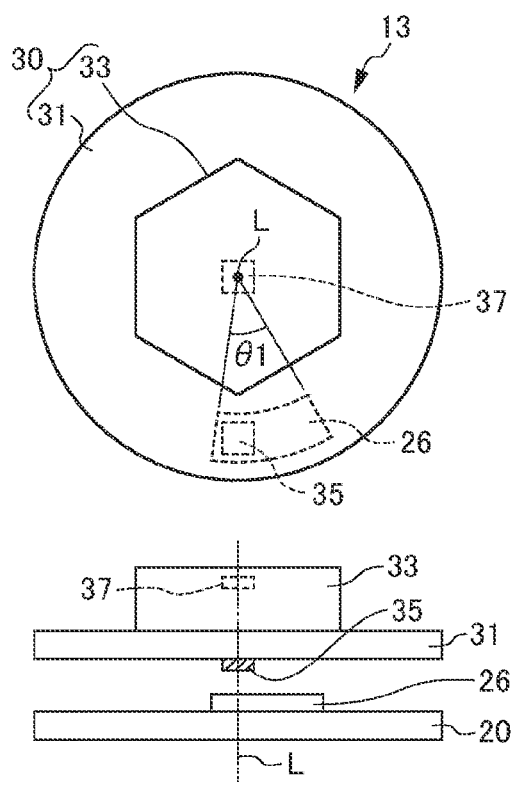
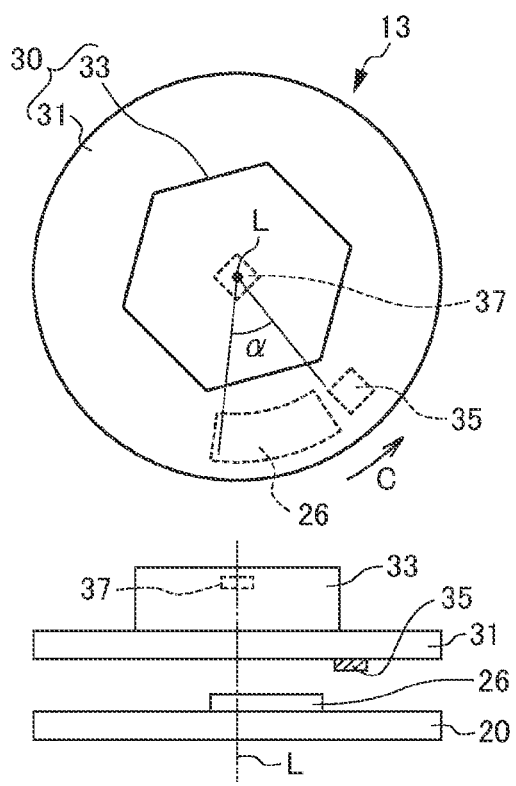

FIG. 8A
FIG. 8B
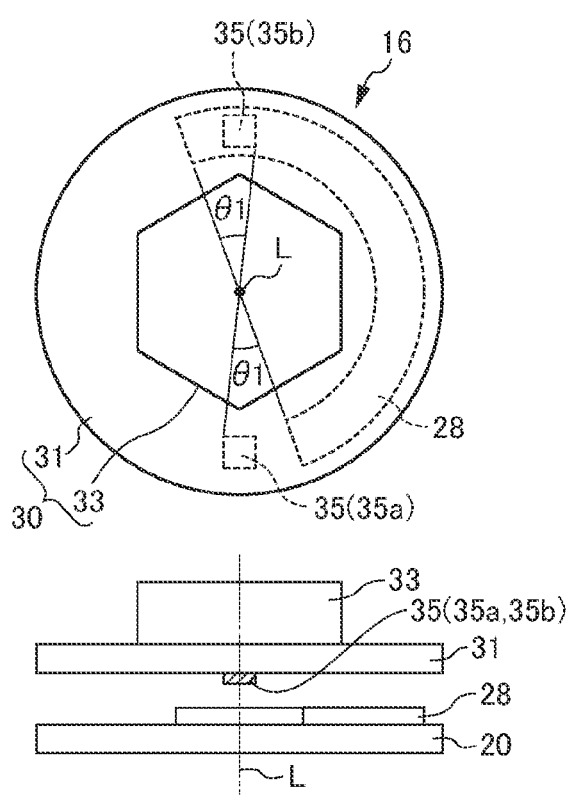
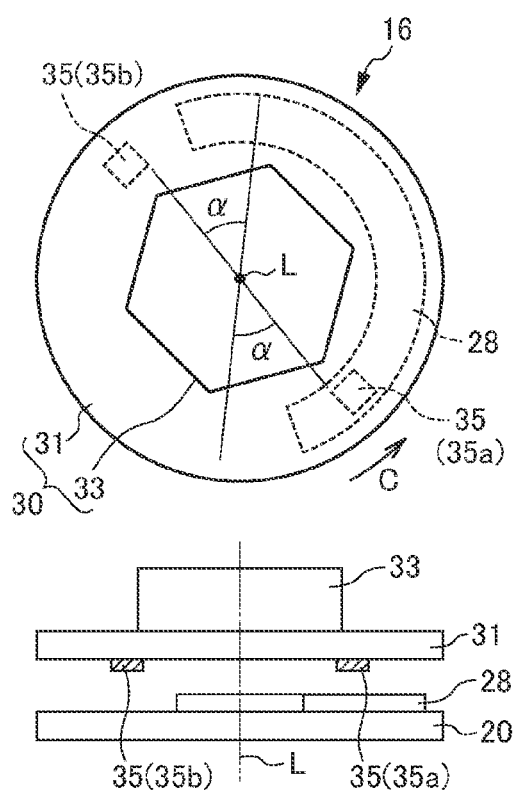

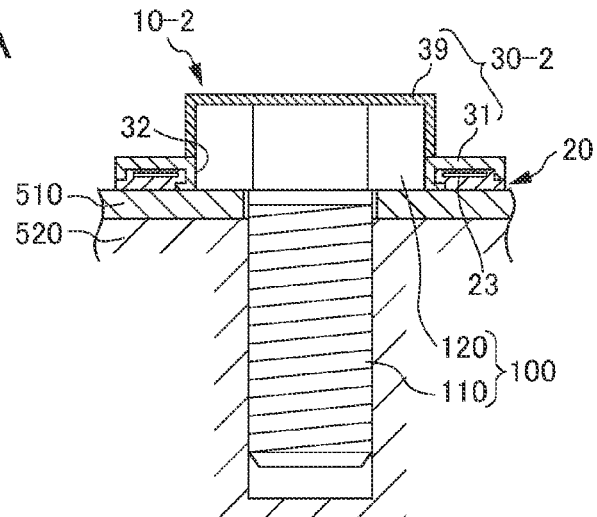
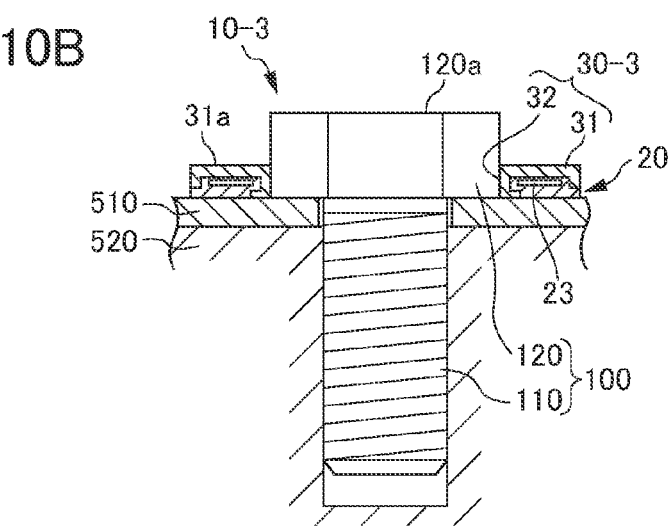
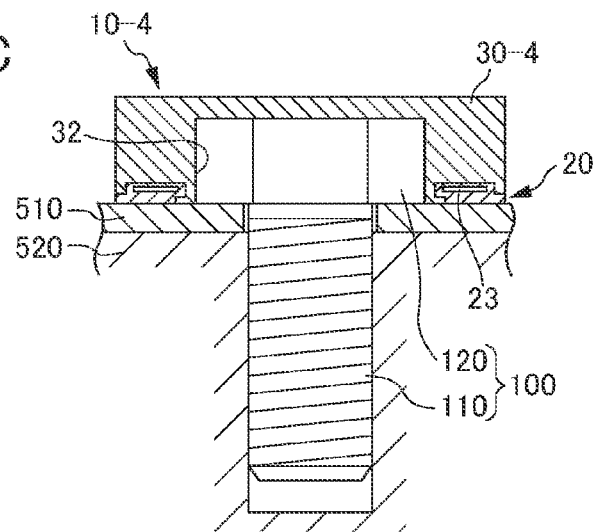

DISPLACEMENT DETECTOR, DISPLACEMENT DETECTION APPARATUS, DISPLACEMENT DETECTION SYSTEM, LOOSENING DETECTOR, LOOSENING DETECTION APPARATUS, AND LOOSENING DETECTION SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This application is based on and claims the benefit of priority from Japanese Patent Application No. 2009-135472, filed on 4 Jun. 2009, the content of which is incorporated herein by reference.

BACKGROUND

The present invention relates to a displacement detector, displacement detection apparatus, and displacement detection system for detecting relative displacement between a fixed member and a movable member using an IC tag, and specifically relates to a loosening detector, loosening detection apparatus, and loosening detection system for detecting loosening of a fastener with respect to an object to be fastened.

RELATED ART

Conventionally, fasteners such as bolts, nuts, and rivets have been used broadly for fastening members and the like in various areas such as vehicles, aircrafts, industrial instruments, machining tool instruments, buildings, and the like. By using these fasteners, it is possible to maintain an object to be securely tightened.

For example, when a component is tightened by a bolt and nut, the component is tightly held while the component such as a metal plate is applied compressing force from the tightened bolt and nut and the bolt on the other hand experiences an axial force generated in a tensile direction.

However, it has been known that even if a fastened member is securely tightened by such a fastener, the fastener tends to become loose over time to result in a decrease of its axial force due to vibration transmitted to the fastener, changes in temperature and humidity, and the like. The loosening of the fastener may lead to a reduction in a fastening function and cause fatigue rupture, separation of components, and the like.

A method for detecting loosening of a fastener over time (reduction in an axial force) is known: a method for detecting loosening through visual inspection of a displacement between markings with paint etc. provided on a fastened member and a fastener, and a method of tapping (hammering) a fastener or a fastened member around the fastener by a hammer so that an operator detects loosening based on tapped sounds.

In addition, methods have been also known for detecting loosening by attaching a strain gauge to a fastener of a measurement target as described in Japanese Unexamined Patent Application Publication No. 2005-140653, or for measuring an axial force of a bolt using ultrasonic sound waves as described in Japanese Unexamined Patent Application Publication No. 2006-308342.

However, in a case of the detection method by way of marking, it is extremely difficult to perform an inspection when a bolt is located where it is difficult to access visually. In addition, there is also a problem in this method: depending on the environment of usage, the paint may come off due to weather, a change in temperature, or the like, which makes detection impossible.

In a case of the detection method by way of hammering, since the determination as to whether loosening has occurred depends on the proficiency attained by an operator, it is difficult to determine for those other than experienced operators, and there is a problem in that even the experienced operators may make an error in the determination due to surrounding environments, physical conditions of the operators, or the like.

On the other hand, with the method using a strain gauge or ultrasonic sound wave, it is possible to stably detect loosening of a fastener over time.

However, for example, with the method by way of the strain gauge, since it is necessary to perform a calibration by a tensile tester between tensile load (axial force) and strain output after the strain gauge is attached to a fastener, this method requires much time and effort for installation.

In addition, the method using ultrasonic sound waves has a problem that an end surface of a head of a bolt and an opposite surface (an end surface on a thread side) are required to be precisely flat in order to ensure inspection accuracy. This method has another problem that since it is necessary to implement contact of a predetermined period of time between an ultrasound probe and each of fasteners to be inspected, it takes time for inspection. This method has a further problem that the cost will increase for an expensive detection device.

SUMMARY OF THE INVENTION

Therefore, it is an object of the present invention to provide a displacement detector, displacement detection apparatus, and displacement detection system that can easily and stably detect a relative displacement between members, and specifically a loosening detector, loosening detection apparatus, and loosening detection system that can easily and stably detect loosening of a fastener with respect to a fastened member.

It should be noted that although an explanation will be provided with numerals corresponding to embodiments of the present invention in order to facilitate understanding of the present invention, the present invention is not limited thereto.

In an aspect of the present invention, a displacement detector (10-17) used for a detection of a relative displacement of a fixed member (510, 520) and a movable member (100) relatively movable with respect to the fixed member is provided, which includes a first member (20) and a second member (30). The first member is secured to the fixed member and composed of an electrical insulator. The second member undergoes relative movement with respect to the fixed member, integrally with the movable member. The second member is disposed opposite to the first member and perpendicular to a direction of the relative movement. The second member is composed of an electrical insulator. Either one of the first member and the second member includes an IC tag for detection (35) performing non-contact communication with a peripheral device, and the other includes a blocking member (23, 26, 28) composed of an electrical conductor that blocks the communication performed by the IC tag for detection.

When the second member undergoes at least a predetermined amount of relative movement with respect to the first member, starting from an initial state in which the first member and the second member are relatively overlapped, the IC tag for detection moves from inside to outside a region of the blocking member, or from outside to inside the region thereof, as viewed from a direction perpendicular to the direction of the relative movement.

In another aspect of the present invention, the displacement detector (10-17) is provided. The movable member includes a fastening member (100) and the fixed member includes a fastened member (510, 520) to be fastened by the fastening member. The movable member moves rotationally relative to the fixed member.

In another aspect of the present invention, a displacement detection apparatus (10-17) is provided, which includes the displacement detector described above and a detection unit (50) performing non-contact communication with the IC tag for detection (35) and detectable whether the non-contact communication with the IC tag for detection can be performed.

In an aspect of the present invention, a loosening detector (10-17) is provided, which moves rotationally relative to a fastened member (510, 520) to detect loosening of a fastening member (100) that is screwed to a threaded hole (520a) of the fastened member, a threaded hole (520a) of another fastening member, or male threads of another fastening member so as to fasten the fastened member. The detector includes a first member (20) and a second member (30). The first member is shaped like a ring composed of an electrical insulator and fixed to the fastened member so that a rotational axis (L) of the fastening member and a center of the first member is concentric. The second member is composed of an electrical insulator and moves rotationally relative to the fastened member integrally with the fastening member. The second member includes a flange (31) and a retainer. The flange is shaped like a ring disposed opposite to the fastened member in a direction of the rotational axis and faces the first member. The retainer is provided on an inner circumference side of the flange and fitted with the fastening member to retain. Either one of the first member and the second member includes an IC tag for detection (35) performing non-contact communication with a peripheral device. The other includes a blocking member (23, 26, and 28) blocking the communication performed by the IC tag. When the second member undergoes at least a predetermined amount of rotational movement about the rotational axis in a direction to release fastening of the fastening member, starting from an initial state in which the first member and the second member are relatively overlapped, the IC tag moves from inside to outside a region of the blocking member, or from outside to inside the region thereof, as viewed in a direction of the rotational axis.

In another aspect of the present invention, the loosening detector (12-15) is provided, in which at least one of the first member (20) and the second member (30) includes another IC tag (27, 37) that is positioned outside the region of the blocking member (23, 26, 28), as viewed in the direction of the rotational axis (L), irrespective of the amount of rotational movement undergone by the second member.

In another aspect of the present invention, the loosening detector (10-17) is provided, in which the first member (20) and the second member (30) each have an engagement portion (24,34) in which the first member and the second member engage with each other so as to regulate movement thereof in the direction of the rotational axis.

In another aspect of the present invention, the loosening detector (10-16), in which the predetermined amount of rotational movement described above includes rotations by 18 degrees or more.

In another aspect of the present invention, the loosening detector (17) is provided, in which the predetermined amount of rotational movement described above includes rotations by 9 degrees or more.

In another aspect of the present invention, the loosening detector (17) is provided, in which the IC tag for detection (35) comprises a plurality of IC tags (35) for detection, and the IC tags for detection move in step-wise manner according to the amount of rotational movement of the second member.

In another aspect of the present invention, the loosening detector (10-17) is provided, in which the second member (30) includes a covering portion (33) covering a top portion of the fastening member (100) that is on an opposite side of the fastened member (510, 520) along the direction of the rotational axis (L).

In another aspect of the present invention, the loosening detector is provided, in which the covering portion comprises metallic construction.

In another aspect of the present invention, the loosening detector (10-17) includes a delivery configuration in which the detector is maintained to be in the initial state by way of a temporary fastener that temporarily secures the first member (20) and an outer periphery of the flange (31) of the second member (30).

In another aspect of the present invention, a loosening detection apparatus is provided, which includes the loosening detector (10-17) described above and a detection unit (50) performing non-contact communication with the IC tag for detection (35) and detectable a state of communication with the IC tag for detection.

In another aspect of the present invention, the loosening detection apparatus further includes a control unit (51) that controls operation of the detection unit.

In another aspect of the present invention, the loosening detection apparatus further includes a recording unit (52) that records information communicated between the IC tag for detection (35) and the detection unit (50).

In an aspect of the present invention, a displacement detection system detecting a relative displacement of a fixed member (510, 520) and a movable member (100) relatively movable with respect to the fixed member is provided. The system includes a fixed portion (20) fixed to the fixed member and a movable portion (30), an IC tag for detection (35), a blocking portion (23, 26, 28) and a detection unit (50). The movable portion is disposed opposite to the fixed portion and moves relative to the fixed member integrally with the movable member. The IC tag for detection is provided to either one of the fixed portion and the movable portion. The blocking portion blocks communication with the IC tag for detection provided to the other of the fixed portion and the movable portion. The detection unit performs non-contact communication with the IC tag for detection and is detectable whether non-contact communication with the IC tag for detection can be performed. The detection unit detects communication between the IC tag for detection and the detection unit, detecting switching from a successful state to an unsuccessful state or an unsuccessful state to a successful state when at least a predetermined amount of relative movement of the movable portion occurs, starting from an initial state in which the fixed portion and the movable portion are relatively overlapped, so that the detection unit detects a relative displacement between the fixed member and the movable member.

In an aspect of the present invention, a loosening detection system to detect loosening of a fastening member (100) that is screwed to a threaded hole of a fastened member, a threaded hole of another fastening member, or male threads of another fastening member so as to fasten the fastened member (510, 520) is provided. The system includes a fixed portion (20) fixed to the fastened member, a movable portion (30), an IC tag for detection (35), a shield (23, 26, 28) and a detection unit (50). The movable portion is disposed opposite to the fixed portion and moves rotationally relative to the fastened member integrally with the fastening member. The IC tag for detection is provided to either one of the fixed portion and the movable portion. The shield is provided to the other of the fixed portion and the movable portion and blocks communication with the IC tag for detection. The detection unit performs non-contact communication with the IC tag for detection and is detectable whether the communication with the IC tag for detection can be performed. The detection unit detects the communication between the IC tag for detection and the detection unit, detecting switching from a successful state to an unsuccessful state or an unsuccessful state to a successful state when the movable portion rotationally moves relative to the fixed portion by at least a predetermined amount in a direction in which the fastening member is released, starting from an initial state in which the fixed portion and the movable portion are relatively overlapped, so that the detection unit detects loosening of the fastening member.

In another aspect of the present invention, the loosening detection system further includes another IC tag (27, 37) that can perform non-contact communication with the detection unit (50), irrespective of the rotational movement of the movable portion (30).

In another aspect of the present invention, the loosening detection system is provided, in which the IC tag for detection (35) includes a plurality of IC tags (35). The IC tags output whether the communication with the detection unit (50) is successful or not independently from one another according to an amount of the rotational movement of the movable portion (30) from the initial state, so that the detection unit can detect an amount of the rotational movement of the fastening member in step-wise manner.

In another aspect of the present invention, the loosening detection system further includes a control unit (51) that controls operation of the detection unit (50).

In another aspect of the present invention, a loosening detection system is provided, which includes the loosening detection apparatus described above and a control unit (51) that controls operation of the loosening detection apparatus.

In another aspect of the present invention, the loosening detection system further includes a recording unit (52) that records information related to a result of communication with the IC tag for detection (35).

According to the present invention, the following effects can be exerted.

The displacement detector enables the detection of displacement between the movable member and the fixed member in non-contact manner by the IC tag for detection detecting whether the non-contact communication with the peripheral device can be performed or not.

Since the movable member is the fastening member, the fixed member is the fastened member that is fastened by the fastening member, and the movable member moves rotationally relative to the fixed member, it is possible to detect loosening of the fastening member such as a bolt and nut.

The displacement detection apparatus includes the displacement detector according to the present invention and the detection unit that can perform non-contact communication with the IC tag for detection and is detectable whether the non-contact communication with the IC tag for detection can be performed or not. Accordingly, it is possible to detect the displacement between the fixed member and the movable member in non-contact manner.

The loosening detector enables easy detection of loosening of the fastening member in non-contact manner by the IC tag for detection detecting whether the non-contact communication with the peripheral device can be performed or not.

Since at least one of the first member and the second member includes the second IC tag that is positioned outside the region of the blocking member as seen in the direction of the rotational axis regardless of the amount of rotation of the second member, it is possible to perform the non-contact communication with the second IC tag even if the IC tag for detection cannot perform the non-contact communication with the peripheral device.

Accordingly, only if information regarding a loosening inspection of the fastening member is recorded to the second IC tag, it is possible to obtain the information regardless of the availability of the communication of the IC tag for detection.

Since the first member and the second member each have the engagement portion where they are engaged with each other so as to regulate movements thereof in the direction of the rotational axis, it is possible to prevent falling of the second member from the first member.

When the second member rotates at least 18 degrees in the releasing direction with respect to the first member from the initial state, the IC tag for detection changes from the state in which the IC tag for detection is positioned inside the region of the blocking member to the state in which the IC tag for detection is positioned outside the region of the blocking member or vice versa. Accordingly, it is possible to detect even a small amount of loosening.

When the second member rotates at least 9 degrees in the releasing direction with respect to the first member from the initial state, the IC tag for detection changes from the state in which the IC tag for detection is positioned inside the region of the blocking member to the state in which the IC tag for detection is positioned outside the region of the blocking member or vice versa. Accordingly, it is possible to detect even a small amount of loosening.

The first member or the second member includes the plurality of the IC tags for detection. The IC tags for detection change in step-wise manner from the state in which the IC tags for detection are positioned inside the region of the blocking member to the state in which the IC tags for detection are positioned outside the region of the blocking member or vice versa, according to the amount of rotation of the second member in the releasing direction with respect to the first member. Accordingly, it is possible to detect an amount of loosening of the fastening member in step-wise manner.

Since the second member includes the covering portion that covers the top portion on the opposite side of the fastened member along the direction of the rotational axis of the fastening member, the fastening member is not exposed outside, so that it is possible to prevent the deterioration of the fastening member.

Since the covering portion is made of metal, it is possible to further tighten the fastening member together with the second member by a tool in the fastening direction without removing the second member.

Since the loosening detector is shipped in the initial configuration in which the first member and the flange of the second member are temporarily fixed, it is not necessary to adjust the positions of the first member and the second member at the time of attaching the loosening detector to the fastener. This will facilitate easier operation of attachment.

Since the loosening detection apparatus includes the loosening detector and the detection unit that is communicable in non-contact manner with the IC tag for detection and detectable the communication state with the IC tag for detection, it is possible to detect easily loosening of the fastening member in non-contact manner.

Since the loosening detection apparatus further includes the control unit for controlling the detection unit, it is possible to control the operation of the detection unit easily.

Since the loosening detection apparatus further includes the recording unit for recording the information related to communication between the IC tag for detection and the detection unit, it is possible to manage various types of information related to: time and date of the loosening detection performed by the loosening detection apparatus, detection results, tightening performed or not, an amount of tightening, identification numbers of operators, and the like.

In the displacement detection system according to the present invention, when the movable portion moves relatively at least the defined amount from the initial state, the detection unit detects the communication between the IC tag and the detection unit switching from a communicable state to a non-communicable state or vice versa, such that the relative displacement between the fixed member and the movable member can be detected. In this manner, it is possible to detect the displacement in non-contact manner.

In the loosening detection system according to the present invention, when the movable portion rotationally moves at least the defined amount in the direction that releases fastening of the fastening member with respect to the movable member from the initial state, the detection unit detects the communication between the IC tag and the detection unit switching from a communicable state to a non-communicable state or vice versa, such that loosening of the fastening member is detected. In this manner, it is possible to detect the displacement in non-contact manner.

Since the second IC tag that can perform non-contact communication with the detection unit regardless of the rotational movement of the movable portion is included, even if the IC tag for detection cannot perform the non-contact communication with the peripheral devices, it is possible for the detection unit to perform the non-contact communication with the second IC tag.

Accordingly, if information regarding a loosening inspection of the fastening member is recorded in the second IC tag, it is possible to obtain the information regardless of the availability of the communication of the IC tag for detection.

Since the plurality of IC tags for detection is included and whether the communication between each of the IC tags for detection and the detection unit can be performed or not changes respectively according to an amount of rotation of the movable portion from the initial state, and it is possible to detect an amount of rotation of the fastening member in step-wise manner, it is possible to detect the amount of loosening of the fastening member in detail.

Since the control unit that controls the operation of the detection unit is included, it is possible to easily control the detection unit.

Since the control unit that controls the operation of the loosening detection apparatus is included, it is possible to facilitate the detection of loosening.

Since the recording unit that records information related to a result of communication with the IC tag for detection is included, it is possible for to manage various types of information such as: time and date of a loosening inspection, results of the inspection, tightening, an amount of tightening, identification numbers of operators, and the like.

DESCRIPTION OF THE DRAWINGS

FIGS. 2A and 2B are diagrams explaining a loosening detector and a loosening detection system, and a loosening detection method according to the first embodiment;

FIGS. 3A and 3B are diagrams explaining a loosening detector and a loosening detection system, and a loosening detection method according to a second embodiment;

FIGS. 4A and 4B are diagrams explaining a loosening detector according to a third embodiment;

FIGS. 5A and 5B are diagrams explaining a loosening detector according to a fourth embodiment;

FIGS. 8A and 8B are diagrams explaining a loosening detector according to a seventh embodiment;

FIGS. 10A to 10C is diagrams showing a loosening detector provided with a cap member according to a modified embodiment.

DETAILED DESCRIPTION

In the following, embodiments according to the present invention are explained with reference to drawings. It should be noted that, including FIG. 1, each figure shown below is schematically shown, so that sizes and shapes of components are appropriately enlarged for facilitating understanding of the present invention.

In addition, numerical values such as dimensions of each of the components, a name of material, and the like described in the specification are only shown as examples, so that the present invention is not limited thereto and it may be possible to adopt alternatives appropriately selected.

First Embodiment

Figure 1A:
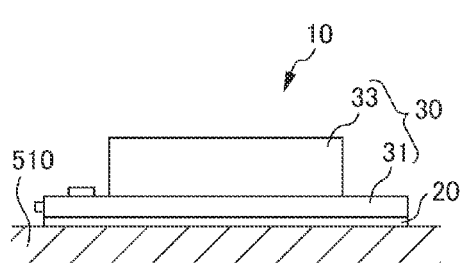
FIGS. 1A to 1D are diagrams explaining a loosening detector according to a first embodiment.
Figure 1B:
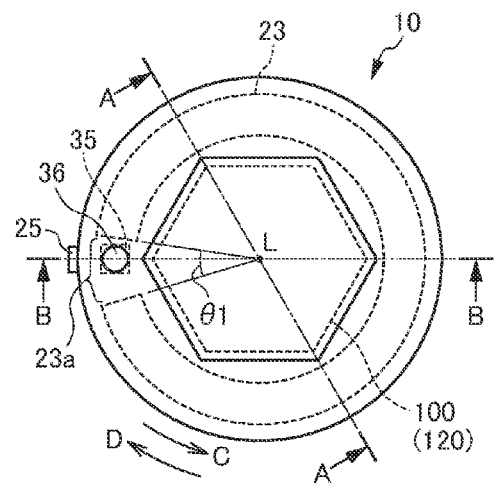
Figure 1C:
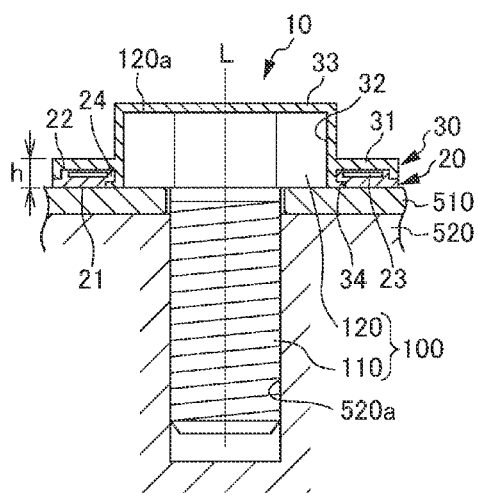
Figure 1D:
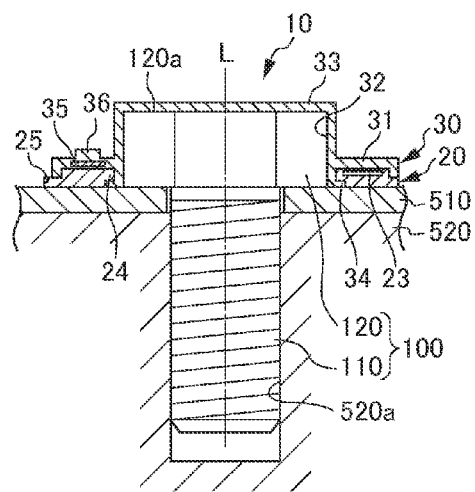

FIGS. 1A to 1D are diagrams explaining a loosening detector according to a first embodiment. FIG. 1A is a lateral view of a loosening detector 10, and FIG. 1B is a plan view of the loosening detector 10. FIG. 1C is a cross-sectional view along an arrow A-A shown in FIG. B and FIG. 1D is a cross-sectional view along an arrow B-B shown in FIG. 1B. It should be noted that FIGS. 1C and D each show a cross section of the loosening detector 10 being mounted to a bolt 100.

The loosening detector 10 includes a ring member 20 fixed to a fastened member 510 such as a metal plate, a flange 31 facing to the ring member 20, and a cap member 30 having a covering portion 33 that covers a head portion 120 of the bolt 100 and a retaining portion 32 that retains a lateral side of the head portion 120 of the bolt 100. The ring member 20 and the cap member 30 are independent of each other.

The loosening detector 10 includes an IC tag for detection 35 disposed at the flange 31 of the cap member 30 and an electrically conductive strip 23 serving as a blocking portion that blocks non-contact communication of the IC tag for detection 35 disposed at the ring member 20. The loosening detector 10 has a function of detecting loosening of the bolt 100 by detecting a change in a state of communication of the IC tag for detection 35.

The bolt 100 of the present invention includes a hexagon bolt having a shank 110 with male threads formed and a substantially hexagonal-column-shaped head portion 120 formed at an end portion of the shank 110.

As shown in FIG. 1C, this bolt 100 is inserted into a hole provided at the fastened member 510 made of metal, used in various areas such as vehicles, aircrafts, and industrial instrument and machining tool instrument, and is screwed together with a threaded hole 520a provided at another fastened member 520 made of metal so as to fasten the fastened member 510 with another fastened member 520.

The present invention employs a hexagon bolt of M24 (JIS B1180) and a width across flat of the head portion 120 is 36 mm, width across corner 39.55 mm, and a height of head (a dimension in a direction of a rotational axis L) 15 mm. This bolt 100 is screwed together with the threaded hole 520a, releasing its fastening when rotated in a direction of an arrow C (a releasing direction) shown in FIG. 1B and fastening the fastened members 510 and 520 when rotated in a direction of an arrow D (a fastening direction).

The loosening detector 10 of the present embodiment is mounted on the head portion 120 of this bolt 100 and detects loosening of the bolt 100.

The loosening detector 10 along with the ring member 20 and the cap member 30 are made of an electrical insulation material such as plastics.

Although the ring member 20 and the cap member 30 according to the present embodiment are made of PPS (polyphenylene sulfide resin) in view of weather resistance, durability, strength, precision molding, and the like, it may be possible to select appropriately from general-purpose plastics, engineering plastics, super-engineering plastics, rubber, and the like, depending on use environments, desired strength, and the like.

The ring member 20 shaped like a ring, which includes a joining surface 21, an opposing surface, an electrically conductive strip 23, a ring engaging portion 24, and a ring positioning portion 25, is a first member that is fixed at the fastened member 510.

As shown in FIGS. 1C and 1D, when the loosening detector 10 is attached to the head portion 120 of the bolt 100, the rotational axis L of the bolt 100 and a center of an inner circle of the ring substantially match. An inner diameter of the ring member 20 is configured to be larger than that of the head portion 120 of the bolt 100.

An inner diameter, outer diameter and thickness of the ring member 20 of the present embodiment are set to 44.5 mm, 60 mm, 3 mm, respectively, since the bolt 100 is M24. However, it may be possible to adjust the dimensions according to the size of the bolt 100.

The joining surface 21 is an end surface of the ring member 20 where the ring member 20 (the loosening detector 10) is joined on a surface of the fastened member 510 by way of an adhesive layer, a double-faced tape, or the like (not shown).

An opposing surface 22 is an end surface opposite to the joining surface 21 and the flange 31 of the cap member 30.

The electrically conductive strip 23 that is a blocking member of a thin plate composed of an electrical conductor such as metal is disposed where blocking of an magnetic field generated by an antenna (not shown) of the IC tag 35 can be performed. In this manner, the electrically conductive strip 23 has a function of blocking non-contact communication between the IC tag 35 and peripheral devices.

Although the electrically conductive strip 23 according to the present embodiment is made of stainless steel, the present invention is not limited thereto, and it may be made of copper, aluminum, and the like.

In addition, the electrically conductive strip 23 of the present embodiment is substantially an annular shape including a cutout 23a.

An angle of the cutout 23a is set to $\theta 1$ (approximately 18 degrees) with respect to the center of the annular shape (the rotational axis L), and this angle $\theta 1$ is equal to an acceptable range of loosening of the bolt 100 according to the present embodiment.

In addition, the electrically conductive strip 23 according to the present embodiment is embedded in the ring member 20 and is arranged not to be exposed to the opposing surface 22 and joining surface 21 of the ring member 20. The opposing surface 22 and the joining surface 21 are made to be substantially flat.

It should be noted that the electrically conductive strip 23 may be arranged to be exposed on the opposing surface 22 and the joining surface 21. Such an arrangement can be selected according to manufacturing conditions, installation environments, or the like.

A ring engaging portion 24 engages with a cap engaging portion 34 (described later) provided to the cap member 30. In the present embodiment, the ring engaging portion 24 is continuously formed along the inner circumference of the ring member 20 toward the cap member 30, while projecting internally in a radial direction.

A ring positioning portion 25 is a marking to determine an initial state of the loosening detector 10 by matching a cap positioning portion 36 provided to the cap member 30 and the ring positioning portion 25 in a circumferential direction.

Herein, the initial state of the loosening detector 10 refers to a state set beforehand in which a relative displacement does not occur between the cap member 30 and the ring member 20 of the loosening detector 10.

The ring positioning portion 25 according to the present embodiment is formed at an outer circumference of the ring member 20 and proximal to the cutout 23a of the electrically conductive strip 23, in substantially a rectangular shape. The ring positioning portion 25 is shaped like a rectangle projecting radially outward as seen from the rotational axis L. However, the ring positioning portion 25 may be shaped like a triangle etc. and is not limited so long as the shape is visually recognizable.

This ring positioning portion 25 is not only used for an alignment of the abovementioned initial state but also, in a case of using a reader writer 50 as a handheld-type device, can be utilised as a point where a non-contact communication with the IC tag 35 is performed by the reader writer 50 (where the reader writer 50 is brought close or applied).

The cap member 30 shaped like a cylinder is a second member, including the flange 31 facing to the ring member 20, the retaining portion 32 that retains a lateral side of the head portion 120 of the bolt 100, the covering portion 33 that covers the head portion 120 of the bolt 100, the cap engaging portion 34 that is engaged with the ring member 20, the IC tag 35, the cap positioning portion 36, and the like.

The cap member 30 follows the rotation of the bolt 100 and is relatively rotatable with respect to the ring member 20. The flange 31 faces the ring member 20 and is formed in substantially an annular shape so as to cover the ring member 20.

Width of the flange 31 according to the present embodiment in a radial direction is 11.8 mm, thickness is approximately 1.5 mm, and as shown in FIG. 1C, height h from a surface of the fastened member 510 to a surface on a side opposite to the ring member of the flange 31 is 4.5 mm, when the loosening detector 10 is attached to the bolt 100. These dimensions can be set appropriately according to sizes of bolts.

The covering portion 33 covers the head portion 120 of the bolt 100. The covering portion 33 according to the present embodiment covers a lateral surface and a top surface 120a of the head portion 120 of the bolt 100.

The retaining portion 32 is formed at an inner circumference side of the flange 31 and the covering portion 33. The retaining portion 32 is hollow and shaped like a hexagonal column so as to fit a shape of the head portion 120 of the bolt 100.

This retaining portion 32 can be fitted with the head 120 of the bolt 100. The retaining portion 32 allows the cap member 30 to be rotated integrally with the head portion 120.

The cap engaging portion 34 is detachably engaged with the ring engaging portion 24 of the ring member 20. In the present embodiment, the cap engaging portion 34 is continuously formed at an outer circumference of the retaining portion 32, projecting radially outward and being closer to the ring member 20 than the flange 31.

By engaging this cap engaging portion 34 with the ring engaging portion 24, the movement of the cap member 30 in a thickness direction (direction of the rotational axis L) with respect to the ring member 20 is regulated so as to prevent falling of the cap member 30.

On the other hand, the movement of the cap member 30 is not regulated in a rotational direction of the bolt 100, and the cap member 30 can be rotated, along with the rotation of the bolt 100, in directions of arrow C and D shown in FIG. 1B with respect to the ring member 20.

The IC tag 35 is an information recording device that is disposed in the flange 31 and can perform non-contact communication with peripheral devices.

The IC tag 35 according to the present embodiment is a lamination of a plurality of insulating substrates (not shown) on a surface of which an antenna (not shown) is formed. The IC tag 35 employs a multilayer-substrate type IC tag in which an IC chip (not shown) is provided on a surface of an insulating substrate or between the insulating substrates (for example, refers to Japanese Unexamined Patent Application Publication 2007-213514).

Such an IC tag is very compact compared to an IC tag with a coiled antenna on a typical substrate made of plastics. An outer shape of the IC tag 35 according to the present invention is substantially a cuboidal shape, a planar shape thereof is approximately 5.5 mm times 5.5 mm, and thickness thereof is approximately 1.0 mm.

The IC tag 35 is embedded in the flange 31 so that a surface thereof parallel to an antenna surface is configured to be substantially parallel with the opposing surface 22 of the ring member 20. A surface of the IC tag 35 is not exposed, so that the surface of the flange 31 is substantially flat. It should be noted that the IC tag 35 is not limited to the example described above, and for example, the surface of the IC tag 35 may be exposed to the surface of the flange 31 and may be bonded to the surface of the flange 31 by an adhesive and the like.

In addition, the IC tag 35 is disposed spaced apart by approximately 2.0 mm in the direction of the rotational axis L of the bolt 100 with respect to the fastened member 510 made of metal so that the communication is not prevented due to the fastened member 510.

It should be noted that, as in the present embodiment, the electrically conductive strip 23 and the IC tag 35 embedded in the ring member 20 and the flange 31, respectively, allow the opposing surface 22 of the ring member 20 and the surface of the flange 31 on a side of the opposing surface 22 to be both flat, and thus the rotation of the cap member 30 with respect to the ring member 20 is not prevented.

In addition, when an area of a flat surface (a surface on a side of the ring member 20) of the IC tag 35 overlapping with the electrically conductive strip 23 as seen from the direction of rotational axis L of the bolt 100 reaches 70% or more of the flat surface of the IC tag 35, non-contact communication is blocked and thus the communication becomes impossible between the IC tag 35 and the reader writer 50. Blocking of communication of an IC tag according to overlapping with an electrically conductive strip depends on types of the reader writer 50 and the IC tag, and a distance in a height direction (direction of the rotational axis L) between a metal member as the electrically conductive strip and the IC tag.

It should be noted that, in the present embodiment, for facilitating understanding of the present invention, the relevant figures as shown below including FIGS. 1A-1D are shown in typical manner: when the entirety of the IC tag lies above the electrically conductive strip as seen from the direction of the rotational axis L of the bolt 100, the communication of the IC tag is blocked.

As shown in FIG. 1B, the cap positioning portion 36 determines an initial state of the loosening detector 10 by allowing the position of the cap positioning portion 36 to match circumferentially the ring positioning portion 25 provided to the ring member 20.

The cap positioning portion 36 according to the present embodiment is formed at a location corresponding to the IC tag 35 of the flange 31 and on an opposite side of the ring member 20 and shaped like a projected disk. However, the shape of the cap positioning portion 36 may be shaped like a concave, a projection shaped like a hemisphere, or the like and is not limited so long as the shape thereof can be visually recognized.

Similar to the ring positioning portion 25, this cap positioning portion 36 is used for an alignment of the initial state of the loosening detector 10. In addition, when a handheld-type device is adopted as the reader writer 50, the cap positioning portion 36 can be utilized as a point where a non-contact communication is performed (where the reader writer is brought close or applied) between the IC tag 35 and the cap positioning portion 36 by way of the reader writer 50.

When the positions of the cap positioning portion 36 and the ring positioning portion 25 are matched in circumferential directions to allow the loosening detector 10 to be in the initial state, as shown in FIG. 1B, the IC tag 35 is positioned in the cutout 23a of the electrically conductive strip 23 when seen from the direction of the rotational axis L, so that the communication is not prevented by the electrically conductive strip 23.

The loosening detector 10 according to the present embodiment may be supplied in a configuration of the initial state. In the initial state, the ring member 20 is engaged with the cap member 30 and the peripheral portions of the ring member 20 and the flange 31 of the cap member 30 are temporarily joined by a temporary joint member etc.

In this way, when mounting the loosening detector 10 to the bolt 100, it is not necessary to reset the initial state, facilitating easier operation.

For this temporary joint member, it may be possible to employ a temporary joint tape etc. made of paper provided with an adhesive on one surface thereof, which provides adhesion sufficient to prevent the rotation of the cap member 30 due to an accidental force.

It should be noted that perforations, slits, or the like may be provided to this temporary joint member in a circumferential direction, for example, at the boundary between the flange 31 and the ring member 20 so that the cap member 30 can be rotated by the rotation of the bolt 100.

FIGS. 2A and 2B are diagrams explaining a loosening detection apparatus and a loosening detection system, and a loosening detection method according to the present embodiment.

With reference to the drawing, a method of using the loosening detector 10 is explained.

FIG. 2A shows that the bolt 100 is not loose and the loosening detector 10 is in an initial state. FIG. 2B shows a state of the loosening detector 10 when the bolt 100 is loose. It should be noted that, in the drawings on the left side of FIGS. 2A and 2B, an upper drawing is a plan view when the loosening detector 10 is seen along the rotational axis L in which a positional relationship between the electrically conductive strip 23 and the IC tag 35 is shown with a broken line. A lower drawing is a lateral imaginary view of the loosening detector 10 in which the IC tag and the electrically conductive strip are shown to be exposed on a surface of the ring member 20 and the cap member 30, respectively, for facilitating understanding of the present invention.

It should be noted that the bolt is omitted in FIGS. 2A and 2B for facilitating understanding of the present invention.

The loosening detection apparatus and the loosening detection system according to the present embodiment are each provided with the loosening detector 10 having the IC tag 35 and the electrically conductive strip 23, the IC tag 35, the reader writer 50 that can perform non-contact communication, CPU (Central Processing Unit) 51, a management server 52, and an input unit 53.

The reader writer 50 can perform non-contact communication with the IC tag 35 and can transmit and receive data and commands to and from the IC tag 35 under a communicable condition.

In addition, the reader writer 50 serves as a detection unit for detecting a state of communication of the IC tag 35 by checking whether the communication with the IC tag 35 is available.

The reader writer 50 may include a memory (not shown) and be configured to cause the memory to record and read the information obtained from the communication with the IC tag 35. The CPU 51 includes a central processing unit connected to the reader writer 50 wiredly or wirelessly.

This CPU 51 is a control unit that sends an instruction to the reader writer 50 to initiate communication with the IC tag 35 based on an input from the input unit 53 and a program recorded in a memory (not shown) in the CPU and performs processing of information related to the IC tag 35 received by the reader writer 50.

Programs and the like for executing various types of processing are recorded beforehand in the memory (not shown). The management server 52 is a recording device that records and manages various types of data according to instructions from the CPU 51.

In the following, a method of using a loosening detector and a loosening detection apparatus according to the present embodiment is explained.

First, the bolt 100 is inserted into the hole of the fastened member 510 and the threaded hole of the fastened member 520. The bolt 100 is rotated to fasten in a fastening direction (a direction of an arrow D shown in FIG. 1B) by a tool such as a wrench (not shown).

In the present embodiment, a fastened state in which the bolt 100 is not loose refers to a state in which after the head 120 of the bolt 100 is seated on the fastened member 510, the bolt 100 is tightened further by 36 degrees (approximately 1/10 rotations).

In addition, acceptable loosening of the bolt 100 is up to approximately 18 degrees (approximately 1/20 rotations) from the fastened state in a releasing direction (a direction of an arrow C shown in FIG. 1B. If the bolt 100 is rotated further, tightening is required further.

Next, the loosening detector 10 supplied in the initial state in which the ring member 20 is engaged with the cap member 30 beforehand is prepared. The head 120 is mated with the retainer 32 such that the loosening detector 10 is attached to a surface of the fastened member 510 after applying an adhesive and the like to the joining surface 21.

It should be noted that the joining operation can be easily performed if the loosening detector 10 is supplied such that an adhesive layer such as a sheet or a film adhesive (not shown) is provided on the joining surface 21 with protection by a liner. In addition, it may be possible that the temporary joint member is not removed from the loosening detector 10.

In case the initial state of the loosening detector 10 is not set beforehand by the temporary joint member or the temporary joint member is removed, the loosening detector 10 should be set to the initial state by rotating the cap member 30 such that the cap positioning portion 36 matches the ring positioning portion 25 in a circumferential direction.

In the initial state of the loosening detector 10, as shown in FIG. 2A, the IC tag 35 is positioned in the cutout 23a provided to the electrically conductive strip 23 and the communication is not prevented by the electrically conductive strip 23.

Next, an operator causes the reader writer 50 to communicate with the IC tag 35 to read a unique ID of the IC tag 35.

The CPU 51 causes the management server 52 to record the unique ID of the read IC tag 53 along with time and date of the bolt 100 being fastened, an identification number of the fastened members 510 and 520, various types of information relating to fastening such as operator's identification numbers.

In addition, it is possible to record various types of information, time and date of the bolt 100 fastened, for example, into the memory (not shown) of the IC tag 35 via the reader writer 50 based on an instruction sent from the CPU 51.

During maintenance, the operator causes the reader writer 50 to detect whether non-contact communication with the IC tag 35 of the loosening detector 10 can be available.

If the bolt is not loose, the positional relationship between the cap member 30 and the ring member 20 of the loosening detector 10 still remains in the initial state.

In addition, so long as the loosening of the bolt 100 is within the acceptable range, the cap member 30 rotates integrally with the rotation (the loosening) of the bolt 100 and the IC tag 35 also moves in the releasing direction (the direction of the arrow C). In this connection, the IC tag 35 is still positioned in the cutout 23a as seen from the direction of the rotational axis L).

Accordingly, the IC tag 35 can perform non-contact communication with the reader writer 50 without being blocked by the electrically conductive strip 23.

If the reader writer 50 tries performing non-contact communication with the IC tag 35 at this time, the reader writer 50 detects the availability of non-contact communication performed by the IC tag 35.

Then, the reader writer 50 can read information recorded in the IC tag 35 based on an instruction from the CPU 51 such as: the unique ID of the IC tag 35, the time and date of a previous inspection, the state of the bolt 100 and etc.

When the CPU 51 determines that the IC tag 35 can perform non-contact communication through the reader writer 50 and that the condition is not changed from that of the communication in the initial state, the CPU 51 causes the management server 52 to record information such as: time and date of an inspection, an operator's ID, a test result, and the like.

In addition, the CPU causes the reader writer 50 to write the information in a predetermined region of the memory of the IC tag 35. In this connection, the information may be overwritten on the previous information or may be written in another region.

However, when the bolt 100 is loose more than the acceptable range (approximately 18 degrees), the cap member 30 rotates at least a predetermined angle θ1 (for example, an angle α shown in FIG. 2B) in the releasing direction integrally with the rotation of the bolt 100, and the IC tag 35 moves above the electrically conductive strip 23 as seen from the direction of the rotational axis L. In this way, the communication of the IC tag 35 is blocked by the conductive strip 23, rendering the IC tag 35 to be unable to communicate with the reader writer 50.

At this time, even if non-contact communication with the IC tag 35 through the reader writer 50 is tried, the reader writer 50 detects that the IC tag 35 cannot perform non-contact communication since the communication of the IC tag 35 is blocked by the electrically conductive strip 23. That is, the reader writer 50 detects that the bolt 100 corresponding to the IC tag 35 becomes loose beyond the acceptable range.

Then, the CPU 51 causes a display unit (not shown) to display the detection of loosening (that is, non-contact communication with the IC tag 35 is impossible).

The operator removes the cap member 30 of the bolt 100 of which loosening has been detected. The operator further tightens the bolt 100 to reach a desirable condition while retaining the head 120 of the bolt 100 by a tool and the like.

After the bolt being tightened, the operator attaches the cap member 30 to the head 120 of the bolt 100, engages the cap engaging portion 34 with the ring engaging portion 24, and matches circumferentially the cap positioning portion 36 and the ring positioning portion 25, thereby allowing the loosening detector 10 to be the initial state again.

Then, the operator causes the reader writer 50 to detect the state of communication of the IC tag 35 again. After confirming the availability of communication of the IC tag 35, and the operator causes the reader writer 50 to allow the memory of the IC tag 35 to record various types of information related to inspection such as: time and date of inspection, an amount of tightening, and an operator's identification number.

In addition, the CPU 51 reads an ID of the IC tag 35 via the reader writer 50 and causes the management sever 52 to record the information such as time and date of tightening and an amount of tightening, etc.

Accordingly, in the present embodiment, the information such as the time and date of inspection, the state of communication of the IC tag at the time of inspection, the time and date of tightening, the amount of tightening, and the operator's identification number, etc. is recorded in the predetermined region of the management server 52 for the unique ID of the IC tag 35.

As described above, according to the present embodiment, it is not necessary to perform an inspection such as confirmation of a marking by a visual inspection performed for respective bolts, hammering, inspection with a detecting method using ultrasonic sound wave or a strain gauge, or the like. Accordingly, loosening of the bolt 100 can be detected easily in a short time of period by detecting the state of communication of the IC tag 35 by the reader writer 50.

Additionally, it is possible to manage the information by the IC tag 35 such as: the time and date of inspection for the bolt 100 corresponding to the IC tag 35 and the amount of tightening of the bolt 100, etc. It is possible to manage the information through the management server 52 related to a plurality of IC tags 35 and furthermore inspections performed for a plurality of bolts 100. In this manner, it is possible to allow not only the related operation to be easier, but also more elaborate and a larger volume of information to be managed.

In addition, since it is possible to detect loosening of the bolt 100 in non-contact manner by non-contact communication between the IC tag 35 and the reader writer 50, it is possible to easily detect loosening of the bolt 100 provided where visual and contact inspections are difficult.

Moreover, it is possible to detect loosening without depending on the proficiency of an operator associated with hammering, for example, it is possible to improve reliability.

In addition, since it is possible to detect loosening easily, a loosening detection operation of the bolt 100 can be performed frequently as a routine inspection, which can lead enhancement of security.

Moreover, since it is possible to detect loosening of the bolt 100 by non-contact communication between the IC tag 35 and the reader writer 50, it is possible to inspect loosening of the plurality of bolts 100 simultaneously by performing communication with a plurality of IC tags at a time, which can improve the efficiency of inspection.

Second Embodiment

FIGS. 3A and B are diagrams explaining a loosening detector, loosening detection apparatus and loosening detection system according to a second embodiment. FIG. 3A shows an initial state and FIG. 3B shows a state in which a bolt is rotated at least a predetermined amount (approximately 18 degrees).

It should be noted that, on the left side of FIGS. 3A and 3B, the upper drawing is a plan view of a loosening detector 11 and the lower drawing is a lateral imaginary view of the loosening detector 11 in which, similar to FIGS. 2A and 2B, an IC tag 35 and an electrically conductive strip 26 are shown to be exposed on surfaces of a ring member 20 and a cap member 30, respectively, for facilitating understanding of the present invention.

In the loosening detector 11, a loosening detection apparatus, and a loosening detection system according to the second embodiment, non-contact communication between the IC tag 35 and a reader writer 50 is unavailable in an initial state and it becomes available when an amount of rotation of the cap member 30 exceeds an acceptable range.

The second embodiment is different from the first embodiment in that loosening of a bolt 100 is detected by detecting a change in a state of communication by the reader writer 50.

Accordingly, portions having functions common to the first embodiment are numbered with identical numerals or numbered with identical numerals at ends of terms to omit redundant explanations appropriately.

The electrically conductive strip 26 according to the second embodiment is shaped like a partial ring and both ends thereof make an angle of θ1 (approximately 18 degrees) in a circumferential direction with respect to a direction of a rotational axis L. This angle θ1 is equal to an acceptable range of loosening of the bolt 100.

In an initial state of this loosening detector 11, the IC tag 35 exists within a region of the electrically conductive strip 26 as seen from the direction of the rotational axis L. Accordingly, the IC tag 35 cannot perform non-contact communication with the reader writer 50 in the initial state.

However, when the bolt 100 becomes loose by vibrations and the like and rotates at least a predetermined amount (approximately 18 degrees), the IC tag 35 moves in a releasing direction (a direction of an arrow C) by the rotation of the cap member 30, and, as shown in FIG. 3B, the IC tag 35 is positioned outside the region of the electrically conductive strip 26. Accordingly, the IC tag 35 can perform non-contact communication with the reader writer 50.

In this way, since it is possible to detect a change in the state of communication of the IC tag 35 through the reader writer 50, it is possible to detect loosening of the bolt 100.

Thus, according to the present embodiment, it is possible to detect loosening of the bolt 100 easily in non-contact manner.

In addition, according to the present embodiment, the IC tag 35 cannot perform the communication with the reader writer 50 in the initial state of the loosening detector 11 (the bolt 100 is not loose). However, since the IC tag 35 can perform the communication when the cap member 30 rotates at least the predetermined amount θ1, it is possible to prevent oversight of loosening of a bolt 100 even if a plurality of loosening detectors 11 is inspected.

Furthermore, according to the present embodiment, it is possible to make the electrically conductive strip 26 small, which leads to a reduction in cost.

Third Embodiment

FIGS. 4A and 4B are diagrams explaining a loosening detector according to a third embodiment. FIG. 4A shows a plan view and a lateral view of a loosening detector in an initial state and FIG. 4B shows a plan view and a lateral view in a state in which a cap member 30 is rotated in a releasing direction beyond an acceptable range.

In FIGS. 4A and 4B to 9A and 9B, similar to FIGS. 2A and B, a bolt 100 and the like are omitted for facilitating understanding of the present invention, an electrically conductive strip 23 and an IC tag 35 are shown by broken lines in a plan view, and the IC tag 35 and the electrically conductive strip 23 are shown to be exposed on surfaces of a ring member 20 and the cap member 30 respectively in a lateral view.

A configuration of the third embodiment is substantially the same as that of the first embodiment other than the feature of a loosening detector 12. The loosening detector 12 includes an IC tag 37 at a covering portion 33 of the cap member 30 and the IC tag 37 does not change a state of communication according to an amount of rotation of the cap member 30.

Accordingly, portions having functions common to the first embodiment are numbered with identical numerals or numbered with identical numerals at ends of terms to abbreviate redundant explanations appropriately.

In the loosening detector 12 according to the third embodiment, the IC tag 37 is embedded at a top portion 33a of the covering portion 33 (a portion corresponding to a top surface 120a of the bolt 100).

The IC tag 37 has a predetermined distance from the top surface 120a so as not to block non-contact communication with the reader writer 50.

This IC tag 37 is a second IC tag that is positioned on a rotational axis L of the bolt 100 and can communicate with a reader writer 50 in non-contact manner. Even if the cap member 30 rotates along with the bolt 100, the positional relationship between the IC tag 37 and the electrically conductive strip 23 does not change.

In addition, although the IC tag 37 is a multilayer-substrate type IC tag similar to the IC tag 35, it may be possible to employ different specifications and shapes.

As shown in FIG. 4A, in an initial state, neither of the IC tags 35 and 37 is positioned above the electrically conductive strip 23 as seen from the direction of the rotational axis L, so that both can perform the communication with the reader writer 50.

However, when the bolt 100 becomes loose from a fastened state, the cap member 30 rotates in a releasing direction along with the rotation of the bolt 100.

Then, when an amount of rotation (an angle α) of the cap member 30 exceeds a predetermined amount (approximately 18 degrees), the IC tag 35 moves to a position above a region of the electrically conductive strip 23 as seen from the direction of the rotational axis L.

In this way, the IC tag 35 for detection cannot perform non-contact communication with the reader writer 50. On the other hand, the IC tag 37 is positioned on the rotational axis L and can perform non-contact communication with the reader writer 50 regardless of the amount of rotation of the cap member 30.

In the present embodiment, an operator causes the reader writer 50 to detect the availability of communication with the IC tags 35 and 37. At this time, a CPU 51 causes the reader writer 50 to transmit commands indicating return of unique IDs to both the IC tags 35 and 37, for example. If the reader writer 50 can perform the communication with both IC tags 35 and 37, the reader writer 50 can read the unique IDs from the IC tags 35 and 37, thereby enabling detection of loosening of the bolt 100, to which the loosening detector 12 is attached, having not exceeded the acceptable range.

In contrast, if the reader writer 50 can perform the communication with the IC tag 37 but cannot perform the communication with the IC tag 35, succeeding in reading only a unique ID of the IC tag 37, it is possible to detect that loosening exceeding the acceptable range has occurred at the bolt 100.

With such an embodiment, the two IC tags 35 and 37 can be selectively employed. For example, the IC tag 35 is used solely for detection. On the other hand, the IC tag 37 is employed to record information related to: time and date of inspection, test results, time and date of tightening, an amount of tightening, etc. Alternatively, the IC tag 37 is employed for identifying the IC tag 35 by recording an identification number of the IC tag 35 (a unique ID of the IC tag 35).

In addition, when the bolt 100 is loose, the first embodiment cannot read information related to time and date of previous inspection, test results, etc. On the other hand, by selectively using the IC tags 35 and 37 as described above, it is possible to obtain the information described above from the IC tag 37 even if the bolt 100 is loose, allowing access to the information when performing a tightening operation.

Furthermore, since the IC tag 35 provided to the bolt 100 in the first embodiment cannot perform non-contact communication when the bolt 100 becomes loose exceeding the predetermined amount, it may be possible to overlook loosening for a case of a plurality of bolts 100 at an inspection. However, in the present embodiment, since the two IC tags 35 and 37 are provided to a single loosening detector 12, the IC tag 37 can perform the communication regardless of the amount of rotation of the cap member 30.

Accordingly, it is possible for the reader writer 50 to detect the communication with the IC tag 37 of the loosening detector 12 attached to the loose bolt 100, preventing oversight of loosening of the bolt 100.

Fourth Embodiment

FIGS. 5A and 5B are diagrams explaining a loosening detector according to a fourth embodiment. FIG. 5A shows an initial state of a loosening detector 13 according to the fourth embodiment and FIG. 5B shows the loosening detector 13 when a bolt 100 becomes loose at least a predetermined amount θ1.

A configuration of the fourth embodiment is substantially the same as that of the first embodiment other than the features as follows: An IC tag 37 does not change a state of communication based on an amount of rotation of a cap member 30, as similar to the third embodiment. In addition, as similar to the second embodiment, an IC tag 35 cannot perform the non-contact communication in the initial state but can perform the non-contact communication when the bolt 100 becomes loose at least the predetermined amount.

Accordingly, portions having functions common to the first embodiment through the third embodiment are numbered with identical numerals or numbered with identical numerals at ends of terms to abbreviate redundant explanations appropriately.

The loosening detector 13 according to the fourth embodiment includes the IC tag 37 at a top surface of a covering portion 33 as similar to the third embodiment.

This IC tag 37 can perform the non-contact communication with a reader writer 50 constantly regardless of the amount of rotation of the cap member 30.

In the initial state as shown in FIG. 5A, the IC tag 35 is positioned above a region of an electrically conductive strip 26 as seen from a direction of a rotational axis L and cannot perform the communication with the reader writer 50.

On the other hand, the IC tag 37 is positioned on the rotational axis L and can perform non-contact communication with the reader writer 50 regardless of the amount of rotation of the cap member 30.

However, when the bolt 100 rotates at least the predetermined amount θ1 (approximately 18 degrees) (for example, an angle α) in a circumferential direction, the cap member 30 rotates integrally with the bolt 100, and the IC tag 35 moves outside the region of the electrically conductive strip 26 as shown in FIG. 5B. Accordingly, both the IC tags 35 and 37 can perform non-contact communication with the reader writer 50.

In this way, by detecting a change in the state of communication of the IC tag 35 (a change from a state of a non-communicable state to a state of a communicable state) by the reader writer 50, it is possible to detect loosening of the bolt 100.

With such an embodiment, the two IC tags 35 and 37 can be selectively employed. For example, the IC tag 35 is used solely for detection. On the other hand, the IC tag 37 is employed for identifying the bolt 100 (ID management of the bolt 100) by recording an identification number of the bolt 100 or is employed to record information related to such as time and date of inspection, test results, time and date of tightening, an amount of tightening, and the like.

In addition, when the bolt 100 is loose, the first embodiment previously described cannot read information related to such as time and date of previous inspection, test results, and the like. However, in the fourth embodiment, by selectively using the IC tags 35 and 37 as described above, it is possible to obtain the information described above even if the bolt 100 is loose, allowing access to the information when performing a tightening operation.

In addition, according to the present embodiment, the IC tag 35 cannot perform the communication in the initial state of the loosening detector 13 (the bolt is not loose); however, since the IC tag 35 can perform the communication when the cap member 30 rotates at least the predetermined amount, it is possible to prevent oversight of loosening of a bolt 100 even if a plurality of loosening detectors 11 is inspected.

Fifth Embodiment

Figure 6A:
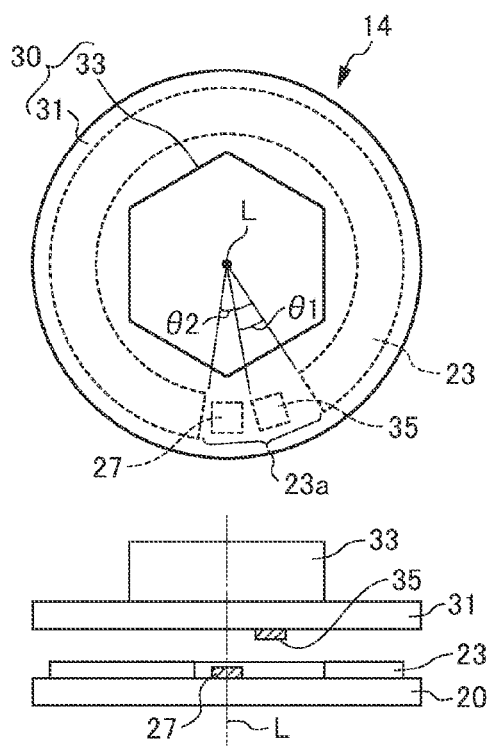
FIGS. 6A and 6B are diagrams explaining a loosening detector according to a fifth embodiment.
Figure 6B:
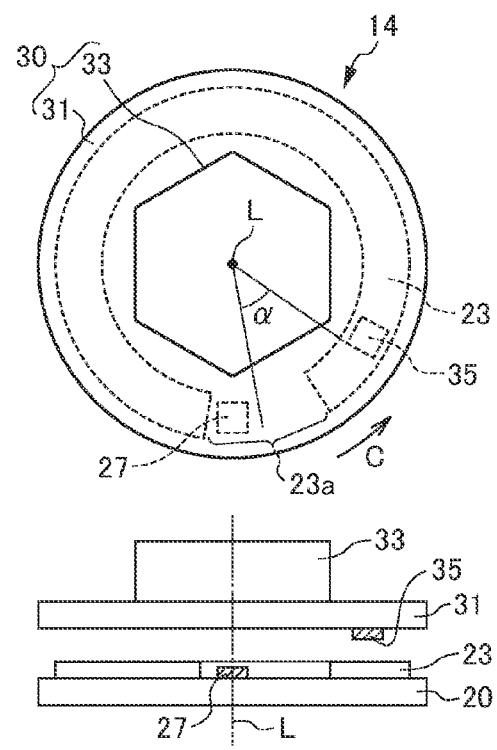

FIGS. 6A and 6B are diagrams explaining a loosening detector according to a fifth embodiment. FIG. 6A shows a plan view and a lateral view of a loosening detector 14 in an initial state and FIG. 6B shows a plan view and a lateral view of the loosening detector 14 in a state in which a bolt 100 becomes loose at least a predetermined amount.

A configuration of the fifth embodiment is substantially the same as that of the first embodiment other than a feature that an IC tag 27 communicable with a reader writer 50 regardless of an amount of rotation of a cap member 30 is provided on a side of a ring member 20.

Accordingly, portions having functions common to the first embodiment are numbered with identical numerals or numbered with identical numerals at ends of terms to abbreviate redundant explanations appropriately.

The loosening detector 14 of the fifth embodiment includes the IC tag 27 at a cutout 23a of an electrically conductive strip 23 of the ring member 20 as shown in FIG. 6A.

This IC tag 27 is a multilayer-substrate type IC tag similar to an IC tag 35 for detection, different specifications and shapes may be employed.

The IC tag 27 is positioned at the cutout 23a of the ring member 20 and can perform the communication without being blocked by the electrically conductive strip 23 even if the cap member 30 rotates at least a predetermined amount along with the bolt 100.

It should be noted that the IC tag 27 according to the present embodiment is disposed so as to be adjacent to the IC tag 35 in a circumferential direction as seen from a direction of a rotational axis L.

Therefore, an angle θ2 of the cutout 23a is greater than the angle θ1 in the first embodiment. As shown n FIG. 6A, an end portion on a side of the IC tag 35 of the electrically conductive strip 23 and an end portion on a fastening direction of the IC tag 35 forms the angle θ1 (approximately 18 degrees).

As shown in FIG. 6A, when the bolt 100 is in a fastened state (the loosening detector 14 is in the initial state) or the bolt 100 becomes loose not more than the predetermined amount θ1 (approximately 18 degrees), both IC tags 35 and 27 are positioned at the cutout 23a of the electrically conductive strip 23 as seen from the direction of the rotational axis L and can perform the communication with the reader writer 50.

However, when the bolt 100 becomes loose, the cap member 30 rotates following the rotation of the bolt 100, and the amount of rotation (an angle α) has at least the defined amount θ1, as shown in FIG. 6B, the IC tag 35 moves above a region of the electrically conductive strip 23 as seen from the direction of the rotational axis L. In this manner, the communication between the IC tag 35 and the reader writer 50 is blocked and the IC tag 35 cannot perform non-contact communication with the reader writer 50.

On the other hand, the IC tag 27 is provided to the ring member 20 so that the IC tag 27 does not move and can perform communication regardless of the amount of the rotation of the cap member 30.

Therefore, according to the present embodiment, it is possible for the reader writer 50 to detect that the IC tag 35 in a communicable state has shifted to a non-communicable state, enabling easier detection of loosening of the bolt 100.

In addition, since the IC tag 27 can perform communication constantly regardless of loosening of the bolt 100, it is possible to write and record information in memory, related to such as: an identification number of the bolt 100 (a unique ID of the bolt 100), time and date of inspection, test results, tightening, an amount of tightening, and the like. In this way, even if the bolt 100 becomes loose at least the predetermined amount and the communication with the IC tag 35 becomes unavailable, it is possible to obtain information related to such as: the identification of the bolt 100, previous loosening test result of the bolt 100, etc. via the reader writer 50, providing reference data to be used at a time of performing a tightening operation.

Furthermore, since the IC tag 27 is provided to the ring member 20, the IC tag 27 is impervious to an external impact and suffering damage as compared to the case of the third embodiment where the IC tag 37 is disposed on the top portion 33a of the covering portion 33.

Sixth Embodiment

Figure 7A:
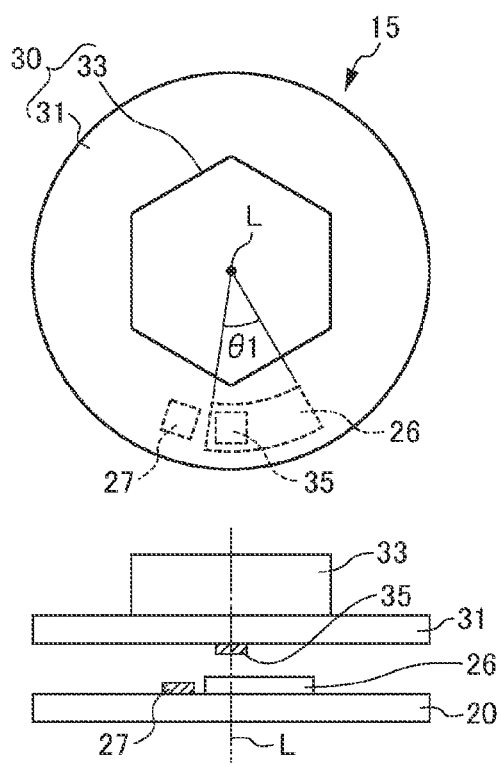
FIGS. 7A and 7B are diagrams explaining a loosening detector according to a sixth embodiment.
Figure 7B:
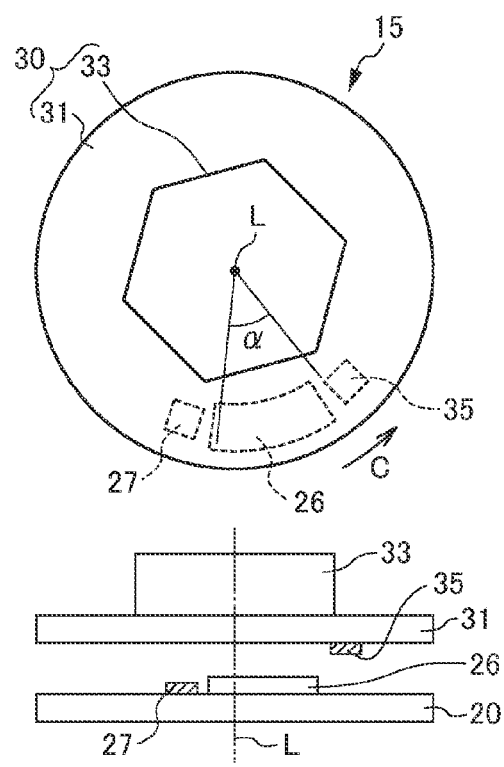

FIGS. 7A and 7B are diagrams explaining a loosening detector according to a sixth embodiment. FIG. 7A shows a plan view and a lateral view of a loosening detector 15 in an initial state and FIG. 7B shows a plan view and a lateral view of the loosening detector 15 in a state in which a bolt 100 becomes loose at least a predetermined amount.

A configuration of the sixth embodiment is substantially the same as that of the first embodiment other than the following features: An IC tag 35 for detection cannot perform non-contact communication with a reader writer 50 in the initial state but can perform the non-contact communication when a cap member 30 rotates at least a predetermined amount θ1, as similar to the second embodiment. An IC tag 27, which can perform non-contact communication with the reader writer 50 regardless of an amount of rotation of the cap member 30, is provided on ring member 20, as similar to the fifth embodiment.

Accordingly, portions having functions common to the first, second, and fifth embodiments are numbered with identical numerals or numbered with identical numerals at ends of terms to abbreviate redundant explanations appropriately.

The loosening detector 15 according to the sixth embodiment includes the IC tag 27 that is disposed in a region of the ring member 20 where an electrically conductive strip 26 is not placed.

In an initial state (the bolt 100 is not loose) as shown in FIG. 7A, the loosening detector 15 is positioned above a region of the electrically conductive strip 26 as seen from a direction of a rotational axis L and non-contact communication with the reader writer 50 is blocked by the electrically conductive strip 26.

On the other hand, the IC tag 27 is not positioned on the region of the electrically conductive strip 26 and can perform the non-contact communication with the reader writer 50. Herein, when the bolt 100 is loose and a cap member 30 rotates at least a predetermined amount θ1 (approximately 18 degrees) along with the bolt 100 in a releasing direction (for example, an angle α shown in FIG. 7B), the IC tag 35 moves in the releasing direction of the bolt 100 and is positioned outside the region of the electrically conductive strip 26 as seen from the direction of the rotational axis L. Accordingly, the IC tag 35 can perform the non-contact communication with the reader writer 50. On the other hand, the IC tag 27 can perform the communication with the reader writer 50 constantly regardless of loosening of the bolt 100.

Therefore, it is possible to detect the availability of the non-contact communication performed by the IC tag 35 with the reader writer 50, enabling easier detection of loosening of the bolt 100.

In addition, by recording information related to previous inspections, for example, into a memory of the IC tag 27, the communication of which is not blocked while the bolt 100 is loose, it is possible to obtain the information described above by way of the reader writer 50 even if the communication with the IC tag 35 is unavailable.

In addition, by recording an identification number (an unique ID) of the bolt 100 into the memory of the IC tag 27 so as to be used for identifying the bolt 100 (ID management of the bolt 100), it is possible to identify the bolt 100 even if the communication with the IC tag 35 is unavailable.

Seventh Embodiment

FIGS. 8A and 8B are diagrams explaining a loosening detector according to a seventh embodiment. FIG. 8A shows a plan view and a lateral view of a loosening detector 16 in an initial state and FIG. 8B shows a plan view and a lateral view of the loosening detector 16 in a state in which a bolt 100 becomes loose at least a predetermined amount.

A configuration of the seventh embodiment is substantially the same as the first embodiment other than a feature of including a plurality of IC tags for detection, of which a state of communication changes according to the rotation of a cap member 30.

Accordingly, portions having functions common to the first embodiment are numbered with identical numerals or numbered with identical numerals at ends of terms to abbreviate redundant explanations appropriately.

The loosening detector 16 according to the seventh embodiment is provided with two IC tags 35a and 35b of which a state of non-contact communication with a reader writer 50 changes when the cap member 30 rotates at least a predetermined amount θ1 (approximately 18 degrees).

In the present embodiment, the two IC tags 35a and 35b are disposed at positions that form an angle 180 degrees around a rotational axis L at a flange 31 of the cap member 30. These IC tags 35a and 35b are similar to the IC tag 35 shown in the first embodiment.

An electrically conductive strip 28 according to the present embodiment is a thin plate member shaped like a partial ring forming an angle of 180 degrees around the rotational axis L. The electrically conductive strip 28 is composed of stainless steel etc. as similar to the first embodiment, and is embedded in a ring member 20.

As shown in FIG. 8A, ends of this electrically conductive strip 28 and the IC tags 35a and 35b are disposed such that the ends and the IC tags 35a and 35b each form an angle θ1 (approximately 18 degrees) around the rotational axis L as seen in the direction of the rotational axis L.

In the initial state as shown in FIG. 8A, as seen in the direction of the rotational axis L, the IC tag 35b is positioned above a region of the electrically conductive strip 28 and the communication with the reader writer 50 is blocked by the electrically conductive strip 28. On the other hand, the IC tag 35a does not overlap with the electrically conductive strip 28, so that the IC tag 35a can perform the non-contact communication with the reader writer 50.

When an operator detects states of communication for the IC tags 35a and 35b by way of the reader writer 50 in this state, the reader writer 50 indicates that the communication with the IC tag 35b is unavailable and the communication with the IC tag 35a is available.

When the bolt 100 becomes loose, the cap member 30 rotates in a releasing direction along with the rotation of the bolt 100, and the IC tags 35a and 35b move in the releasing direction with respect to the electrically conductive strip 28 around the rotational axis L.

However, whether the non-contact communication with the reader writer 50 is available or not for the IC tags 35a and 35b is the same as the initial state until an amount of the rotation of the bolt 100 reaches at least the predetermined amount (approximately 18 degrees).

When the bolt 100 rotates at least the defined amount θ1 (an angle α), as shown in FIG. 8B, the IC tag 35b is positioned in a region in which the electrically conductive strip 28 does not exist as seen in the direction of the rotational axis L, and the IC tag 35a is positioned above the electrically conductive strip 28.

In this manner, the communication between the IC tag 35a and the reader writer 50 is blocked by the electrically conductive strip 28; on the other hand, the IC tag 35b can perform the communication with the reader writer 50. Accordingly, it is possible to detect whether the states of communication with the IC tags 35a and 35b have been changed from the initial state through the reader writer 50.

According to the present embodiment, when the bolt 100 becomes loose at least the predetermined amount, the states of communication of the IC tags 35a and 35b are changed, it is possible to detect loosening of the bolt 100 at least the predetermined amount easily.

It should be noted that, in the present embodiment, although the number of the electrically conductive strip 28 is one, it may be two (corresponding to the number of the IC tags 35a and 35b), and the angle formed by the IC tags 35a and 35b with respect to the rotational axis L of is not limited to 180 degrees and may be selected arbitrarily.

Eighth Embodiment

Figure 9A:
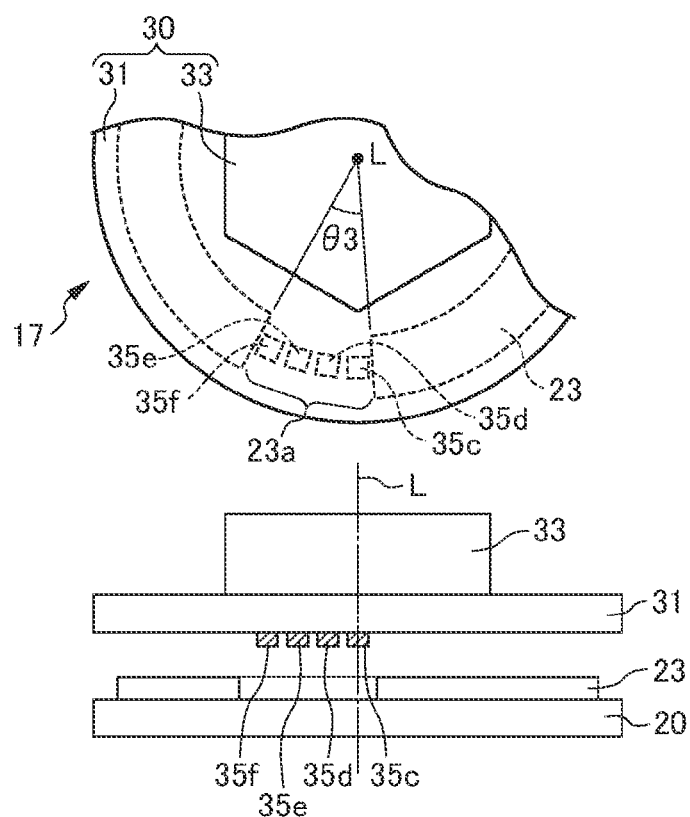
FIGS. 9A and 9B are diagrams explaining a loosening detector according to an eighth embodiment.
Figure 9B:
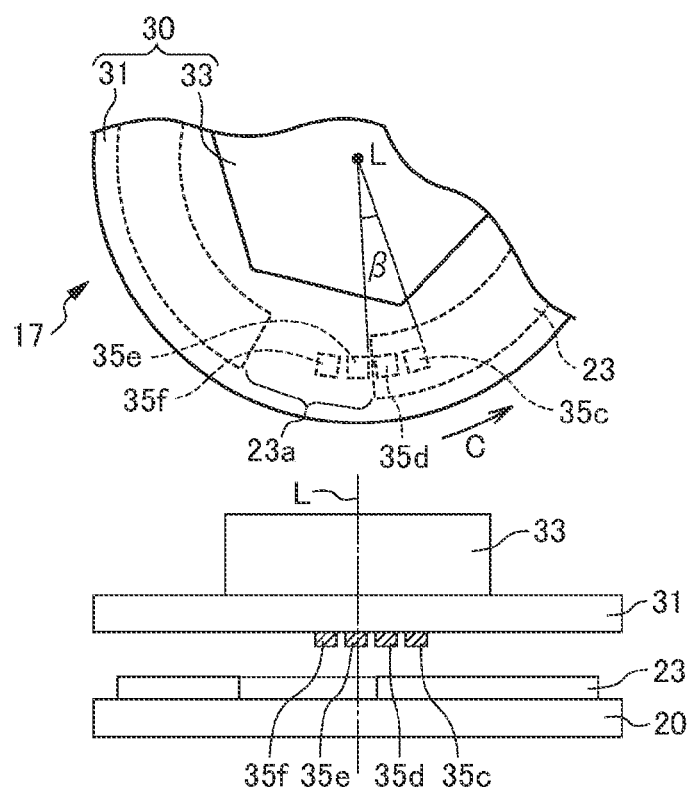

FIGS. 9A and 9B are diagrams explaining a loosening detector according to an eighth embodiment. FIG. 9A shows an enlarged view and a lateral view. The enlarged view shows a portion of a plan view for an initial state of a loosening detector 17. FIG. 9B shows an enlarged view and a lateral view. The enlarged view shows a portion of a plan view of the loosening detector 17 for a state in which a bolt 100 is loose at least a defined amount.

A configuration of the eighth embodiment is substantially the same as that of the first embodiment other than a feature of a plurality of IC tags for detection.

Accordingly, portions having functions common to the first embodiment are numbered with identical numerals or numbered with identical numerals at ends of terms to abbreviate redundant explanations appropriately.

The loosening detector 17 according to the eighth embodiment includes four IC tags 35 (35c, 35d, 35e, and 35f) at a flange 31 of a cap member 30. The IC tags 35c to 35f are the same type as the IC tag 35 shown in the first embodiment and are multilayer-substrate type IC tags.

A cutout 23a of an electrically conductive strip 23 forms an angle θ3 (approximately 36 degrees) with respect to a rotational axis L. As shown in FIG. 9A, the IC tags 35c to 35f are disposed in the initial state at regular intervals (approximately 9 degrees with respect to the rotational axis L) in a circumferential direction in the cutout 23a of the electrically conductive strip 23 as seen in the rotational axis L.

In the initial state of the loosening detector 17 as shown in FIG. 9A, all of the IC tags 35c to 35f are positioned at the cutout 23a as seen in the direction of the rotational axis L and can perform non-contact communication with a reader writer 50. Accordingly, an operator detects through the reader writer 50 that the communication with all of the four IC tags 35c to 35f are available, verifying that loosening of the bolt 100 at least the predetermined amount has not occurred.

Suppose the bolt 100 becomes loose due to vibrations etc.

For example, when the bolt 100 becomes loose and rotates by approximately 9 degrees in a releasing direction from a fastened state, a cap member 30 also rotates along with the rotation of the bolt 100.

Thus, the IC tags 35c to 35f rotationally move in the releasing direction. And only the IC tag 35c is positioned above the electrically conductive strip 23 as seen in the direction of the rotational axis L and the communication of the IC tag 35c is blocked. On the other hand, the IC tags 35d to 35f can perform the communication with the reader writer 50.

Next, when the bolt 100 rotates by approximately 18 degrees from the fastened state, the cap member 30 rotates by approximately 18 degrees (an angle β shown in FIG. 9B) along with the rotation of the bolt 100 from the initial state. At this time, as shown in FIG. 9B, the IC tags 35c and 35d are positioned above the region of the electrically conductive strip 23 as seen in the direction of the rotational axis L, and the IC tags 35c and 35d cannot perform the non-contact communication with the reader writer 50.

Furthermore, when the bolt 100 rotates by approximately 27 degrees from the initial state, the cap member 30 rotates by approximately 27 degrees along with the rotation of the bolt 100. At this time, the IC tags 35c to 35e are positioned above the region of the conductive strip 23 as seen in the direction of the rotational axis L, and the IC tags 35c to 35e cannot perform the non-contact communication with the reader writer 50.

Then, when the bolt 100 rotates by approximately 36 degrees from the initial state, the cap member 30 rotates by approximately 36 degrees along with the rotation of the bolt 100 from the initial state. At this time, all of the IC tags 35c to 35f are positioned above the electrically conductive strip 23, and the IC tags 35c to 35f cannot perform the non-contact communication with the reader writer 50.

Thus, according to the present embodiment, since the availability of communication with the four IC tags 35c to 35f for detection changes according to the amount of rotation (an amount of loosening) of the bolt, it is possible to detect the amount of rotation of the bolt in step-wise manner by detecting changes in states of communication between the IC tags 35c to 35f and the reader writer 50. Thus, it is possible to detect loosening of the bolt 100 with higher accuracy.

In addition, since the present embodiment provides the amount of rotation of the bolt 100 in step-wise manner, it is possible to obtain guidelines for an amount of tightening when tightening of the loose bolt 100 is required, facilitating easier tightening operation.

It should be noted that although the present embodiment shows the four IC tags 35c to 35f arranged in every 9 degrees, the present invention is not limited thereto. Intervals (angles) for arrangement, the number thereof, and the like may be selected appropriately according to size of IC tags for detection and bolts, accuracy of inspection, and the like.

In addition, similar to the IC tag 27 according to the fifth embodiment, either one of the IC tags, for example, the IC tag 35f is disposed at a ring member 20 like the electrically conductive strip 23. In this manner, the IC tag 35f is used for identifying the bolt 100 (ID management) and recording detection results of loosening detection. The other IC tags 35c to 35e are used for detecting the amount of rotation of the bolt 100. An IC tag used for recording as the ID management of the bolt 100 is not limited to the IC tag 35f as described above and may be selected arbitrarily.

Modified Embodiments

The present invention is not limited to the embodiments described above and can be modified and transformed variously, which are also within the scope of the present invention.

Although each embodiment shows an example in which the fastened member 510 is set to the fixed member and the bolt 100 that is rotated relative to the fastened member to fasten the bolt 100 is set to the movable member so as to detect loosening (rotation) of the bolt 100, the present invention is not limited thereto. Alternatively, the movable member may be set to a member that undergoes relative movement in a linear direction with respect to the fixed member to serve as a displacement detector, a displacement detection apparatus, and a displacement detection system in a linear direction.

With a configuration to detect the displacement in the linear direction, for example, the present invention can be used as a detector, a detection apparatus, and a detection system that detect opening and closing of a sliding door used as a dividing door for various vehicles such as a train, a room, and the like.

Although each embodiment shows an example in which the cap member 30 includes the covering portion 33 that covers the head 120 of the bolt 100 and the flange 31 facing the ring member 20, and the covering member 33 and the flange 31 are made of the same material, the present invention is not limited thereto. It may be possible to employ a cap member with the following configuration, for example.

FIGS. 10A to 10C are diagrams showing a loosening detection apparatus including a cap member in a modified embodiment. It should be noted that FIGS. 10A to 10C show cross-sectional views corresponding to the cross section of the arrow A-A of FIG. 1B for loosening detectors 10-2 to 10-4 including cap members 30-2 to 30-4 in a modified embodiment. In addition, configurations of all of ring members 20 in the loosening detectors 10-2 to 10-4 shown in FIGS. 10A to 10C are the same as that of the first embodiment.

FIG. 10A shows the loosening detector 10-2 including the cap member 30-2 of which a covering portion 39 is made of metal. With a configuration in which the covering portion 39 is made of metal such as stainless steel, iron, etc. as similar to the cap member 30-2 in this modified embodiment, it is possible to perform tightening for a bolt 100 with the attached cap member 30-2. Thus, it is not necessary to perform the following steps: removing the cap member 30-2 from the loose bolt 100, tightening the loose bolt 100, and fitting again the cap member 30-2 with a head portion 120 of the bolt 100. As a result, it is possible to reduce operating time and improve tightening operation.

At this time, if an outer shape of the covering portion 39 is configured to be that of a head portion of a bolt of which size is larger than that of the bolt 100 (if the bolt 100 is a size of M24, the outer shape of the covering portion 39 is configured to be that of the head portion of bolt of M27 or M30), it is possible to perform tightening by way of tools such as a standardized wrench.

It should be noted that, although FIG. 10A shows a configuration of a retainer 32 including a metal surface of the covering portion 39 and a plastic surface of the flange 31, the present invention is not limited thereto and may be configured so that a dimension of the covering portion 39 in the direction of the rotational axis L extends up to a fastened member so that an entire surface of the retainer 32 becomes a metal surface.

FIG. 10B shows a loosening detector 10-3 including a cap member 30-3 without a covering portion. The cap member 30-3 of this modified embodiment is configured such that a portion of the head portion 120 on a side of the top surface 120a of the bolt 100 to which the loosening detector 10-3 is attached projects to be exposed on the loosening detector 10-3 without the covering portion. With the loosening detector 10-3, it is possible to perform tightening of the bolt 100 by a tool such as a wrench and a spanner without removing the cap member 30-3. In this manner, it is possible to facilitate tightening operation and reduce operation time.

It should be noted that, regarding the cap member 30-3 shown in FIG. 10B, the bolt 100 is a size of M24, the height from the surface of the fastened member 510 to the upper surface 31a of the flange 31 is 4.5 mm, and the height of the head portion 120 of the bolt 100 is a size of M24 and 15 mm. Accordingly, the head portion 120 is exposed by 10.5 mm, i.e., at least two thirds of the entire head portion 120 is exposed relative to the loosening detector 10-3. Accordingly, it is possible to perform tightening while retaining the head portion 120 by a tool such as a wrench.

FIG. 10C shows a cap member 30-4, without a flange, of which external shape is like a cylinder.

With such a configuration, it is possible to simplify manufacturing of a die etc. of the cap member 30-4. It should be noted that, in a case of deleting the flange, an external shape of the cap portion may be configured to be like a hemisphere, a cone, and the like. With such a shape, it is possible not only to hide a bolt, preventing mischief or theft by malicious third persons, and also to improve design quality.

Furthermore, although each embodiment shows an example in which the covering portion 33 of the cap member 30 covers a lateral surface and the top surface 120a (refer to FIG. 1C) of the head portion 120 of the bolt 100, the present invention is not limited thereto. It may be that: the top portion 33a (refer to FIGS. 4A and 4B) covering the top surface 120a is dispensed with according to the shapes of the head portion 120 and the top surface 120a; and the covering portion 33 is configured so that the lateral surface of the head portion 120 is solely covered and the top surface 120a is exposed. It should be noted that this configuration can be applied to the cap members 30-2 and 30-4 of the modified embodiments previously described. With such a configuration, it is possible to apply the cap member to bolts with top surfaces 120a on which a cross recess, a hexagon socket, and the like are formed.

The first embodiment through the eighth embodiment show examples in which the acceptable range of the loose bolt 100 is set to the rotation up to approximately 18 degrees in the releasing direction from the fastened state of the bolt. The present invention is not limited thereto and may be configured to set a predetermined amount of 9 degrees so as to detect smaller loosening or rotation of at least 9 degrees and to appropriately set an acceptable range and a predetermined amount according to the size of a bolt 100, a desired axial force, and the like.

Although each embodiment shows an example in which a temporary joint tape and the like are attached to the outer peripheral portion of the flange 31 and the ring member 20 to allow the loosening detectors 10 through 17 to be maintained in the initial state. The present invention is not limited thereto and may be configured so that, for example, either one of a cap portion or a ring portion is provided with a projection in a convex shape (not shown) and the other is provided with a concave portion (not shown) engaging with the projection in order to maintain the initial state of the ring member 20 and the cap member 30 for the loosening detectors 10 through 17. It should be noted that a force of the engagement should not be more than a force that can be easily released by the rotation of the bolt 100.

Although each embodiment shows an example of providing a positioning portion in a convex shape as the cap positioning portion 36 and the ring positioning portion 25 in order to set the initial states for the loosening detectors 10 through 17. The present invention is not limited thereto and may employ an alternate shape or symbol which can be visually recognized.

Each embodiment shows an example in which the IC tag 35 for detecting loosening is disposed at the cap member 30 (the movable portion) and the electrically conductive strips 23, 26, and 28 are disposed at the ring member 20(the fixed member). The present invention is not limited thereto and may be configured so that the IC tag 35 for detecting loosening is disposed at the ring member 20 (the fixed member) and the electrically conductive strips 23, 26, and 28 are disposed at the cap member 30 (the movable member).

It may be that the location of an IC tag is determined according to environments in which the loosening detectors 10 through 17 are used and for the purpose of facilitating design and manufacture.

Although the embodiments show examples in which the loosening detectors 10 through 17 are attached to the head portion 120 of the bolt 100, the present invention is not limited thereto and the loosening detectors 10 through 17 may be attached to a nut (not shown) that is threaded together on a side of the shank 110 of the bolt 100. In addition, although the example has been shown that the bolt 100 is threaded together with the thread hole 520*a* of the fastened member 520, the bolt 100 may fasten a plurality of fastened members while the bolt 100 is inserted into holes provided at the plurality of fastened members and a nut (not shown) may be threaded together with male threads of the shank 110.

Although each embodiment explains that the hexagon bolt 100 of which the shape of the head portion 120 is like a hexagon column as an example, the shape of the head portion 120 is not limited thereto and another shape may be employed. For example, if the shape of the retainer 32 of the cap member 30 is adjusted to be a shape matching the head portion 120, it is possible to apply the cap member 30 to a square bolt, a bolt with a hexagon socket, and the like. In addition, a size of the bolt 100 is not limited to M24 and may be selected from M20, M22, M27, M30, and the like, for example.

Although each embodiment shows an example in which the ring member 20 is shaped like a circular, the present invention is not limited thereto. The ring member may be configured to be a partial ring with a cutout instead of a complete ring when the bolt 100 does not provide an area throughout its circumference that is available for fixing the ring member 20. It should be noted that, in this case, the cap member 30 and the flange 31 may be configured to be shaped like a partial ring similar to the ring member 20. With such a configuration, it is possible to dispose a loosening detector so as to match a shape of an area where the bolt 100 of the fastened member is disposed. This will allow the present invention to be more friendly for users.

Although each embodiment shows that the reader writer 50 is connected to the CPU 51, the present invention is not limited thereto and may be configured so that the reader writer 50 includes CPU therein so as to be portable.

Each embodiment employs a multilayer-substrate type IC tag, IC tags 35, 37, or 27, for example. The IC tag has an antenna on the surface of an insulating substrate, which is laminated to be multilayered. An IC chip is disposed on the surface of the substrate. The present invention is not limited thereto and it may be possible to adopt an IC tag in which a coil-shaped antenna is formed at a plastic base material and an IC tag with another shape or specification.

It should be noted that, although the present embodiments and the modified embodiments can be combined appropriately, detailed descriptions therefore are omitted. In addition, the present invention is not limited to each embodiment described above.

It is claimed:

1. A displacement detector used for a detection of a relative displacement of a fixed member and a movable member relatively movable with respect to the fixed member, comprising:
    a first member secured to the fixed member and composed of an electrical insulator; and
    a second member undergoing relative movement with respect to the fixed member, integrally with the movable member, the second member being disposed opposite to the first member and perpendicular to a direction of the relative movement, and the second member being composed of an electrical insulator, wherein
    either one of the first member and the second member includes an IC tag for detection performing non-contact communication with a peripheral device, and the other includes a blocking member composed of an electrical conductor that blocks the communication performed by the IC tag for detection, and
    when the second member undergoes at least a predetermined amount of relative movement with respect to the first member, starting from an initial state in which the first member and the second member are relatively overlapped, the IC tag for detection moves from inside to outside a region of the blocking member, or from outside to inside the region thereof, as viewed from a direction perpendicular to the direction of the relative movement.

2. The displacement detector according to claim 1, wherein the movable member comprises a fastening member,
    the fixed member comprises a fastened member to be fastened by the fastening member, and
    the movable member moves rotationally relative to the fixed member.

3. A displacement detection apparatus, comprising:
    the displacement detector according to claim 1; and
    a detection unit performing non-contact communication with the IC tag for detection and detectable whether the non-contact communication with the IC tag for detection can be performed.

4. A loosening detector moving rotationally relative to a fastened member to detect loosening of a fastening member that is screwed to a threaded hole of the fastened member, a threaded hole of another fastening member, or male threads of another fastening member so as to fasten the fastened member, the detector comprising:
    a first member shaped like a ring composed of an electrical insulator, the first member being fixed to the fastened member so that a rotational axis of the fastening member and a center of the first member is concentric, and
    a second member that is composed of an electrical insulator and moves rotationally relative to the fastened member integrally with the fastening member, the second member comprising a flange and a retainer, the flange being shaped like a ring that is disposed opposite to the fastened member in a direction of the rotational axis and faces the first member, the retainer being provided on an inner circumference side of the flange and fitted with the fastening member to retain, wherein either one of the first member and the second member includes an IC tag for detection performing non-contact communication with a peripheral device, and the other includes a blocking member blocking communication performed by the IC tag, and when the second member undergoes at least a predetermined amount of rotational movement about the rotational axis in a direction to release fastening of the fastening member, starting from an initial state in which the first member and the second member are relatively overlapped, the IC tag moves from inside to outside a region of the blocking member, or from outside to inside the region thereof, as viewed in a direction of the rotational axis.

5. The loosening detector according to claim 4, wherein at least one of the first member and the second member includes another IC tag that is positioned outside the region of the blocking member, as viewed in the direction of the rotational axis, irrespective of the amount of rotational movement undergone by the second member.

6. The loosening detector according to claim 4, wherein the first member and the second member each have an engagement portion in which the first member and the second member engage with each other so as to regulate movement thereof in the direction of the rotational axis.

7. The loosening detector according to claim 4, wherein the predetermined amount of rotational movement comprises rotations by 18 degrees or more.

8. The loosening detector according to claim 4, wherein the predetermined amount of rotational movement comprises rotations by 9 degrees or more.

9. The loosening detector according to claim 4, wherein the IC tag for detection comprises a plurality of IC tags for detection, and the IC tags for detection move in stepwise manner according to the amount of rotational movement of the second member.

10. The loosening detector according to claim 4, wherein the second member includes a covering portion covering a top portion of the fastening member that is on an opposite side of the fastened member along the direction of the rotational axis.

11. The loosening detector according to claim 10, wherein the covering portion comprises metallic construction.

12. The loosening detector according to claim 4, wherein the detector comprises a delivery configuration in which the detector is maintained to be in the initial state by way of a temporary fastener that temporarily secures the first member and an outer periphery of the flange of the second member.

13. A loosening detection apparatus comprising:
the loosening detector according to claim 4; and
a detection unit performing non-contact communication with the IC tag for detection and detectable a state of communication with the IC tag for detection.

14. The loosening detection apparatus according to claim 13, further comprising a control unit that controls operation of the detection unit.

15. The loosening detection apparatus according to claim 13, further comprising a recording unit that records information communicated between the IC tag for detection and the detection unit.

16. A displacement detection system detecting a relative displacement of a fixed member and a movable member relatively movable with respect to the fixed member, the system comprising:

a fixed portion fixed to the fixed member;
a movable portion disposed opposite to the fixed portion and moving relative to the fixed member integrally with the movable member;
an IC tag for detection provided to either one of the fixed portion and the movable portion;
a blocking portion blocking communication with the IC tag for detection provided to the other of the fixed portion and the movable portion; and
a detection unit performing non-contact communication with the IC tag for detection and detectable whether non-contact communication with the IC tag for detection can be performed,
wherein the detection unit detects communication between the IC tag for detection and the detection unit switching from a successful state to an unsuccessful state or an unsuccessful state to a successful state when at least a predetermined amount of relative movement of the movable portion occurs, starting from an initial state in which the fixed portion and the movable portion are relatively overlapped, so that the detection unit detects a relative displacement between the fixed member and the movable member.

17. A loosening detection system to detect loosening of a fastening member that is screwed to a threaded hole of a fastened member, a threaded hole of another fastening member, or male threads of another fastening member so as to fasten the fastened member, the system comprising:

a fixed portion fixed to the fastened member;
a movable portion disposed opposite to the fixed portion and moving rotationally relative to the fastened member integrally with the fastening member;
an IC tag for detection provided to either one of the fixed portion and the movable portion;
a shield provided to the other of the fixed portion and the movable portion and blocking communication with the IC tag for detection; and
a detection unit performing non-contact communication with the IC tag for detection and detectable whether the communication with the IC tag for detection can be performed,
wherein the detection unit detects the communication between the IC tag for detection and the detection unit switching from a successful state to an unsuccessful state or an unsuccessful state to a successful state when the movable portion rotationally moves relative to the fixed portion by at least a predetermined amount in a direction in which the fastening member is released, starting from an initial state in which the fixed portion and the movable portion are relatively overlapped, so that the detection unit detects loosening of the fastening member.

18. The loosening detection system according to claim 17, further comprising another IC tag that can perform non-contact communication with the detection unit, irrespective of the rotational movement of the movable portion.

19. The loosening detection system according to claim 17, wherein the IC tag for detection comprises a plurality of IC tags, the IC tags output whether the communication with the detection unit is successful or not independently from one another according to an amount of the rotational movement of the movable portion from the initial state, so that the detection unit can detect an amount of the rotational movement of the fastening member in step-wise manner.

20. The loosening detection system according to claim 17, further comprising a control unit that controls operation of the detection unit.

21. A loosening detection system comprising:
   the loosening detection apparatus according to claim 13; and
   a control unit that controls operation of the loosening detection apparatus.

22. The loosening detection system according to claim 15, further comprising a recording unit that records information related to a result of communication with the IC tag for detection.

* * * * *